(12) United States Patent
Boutaud et al.

(10) Patent No.: US 11,669,092 B2
(45) Date of Patent: Jun. 6, 2023

(54) TIME OF FLIGHT SYSTEM AND METHOD FOR SAFETY-RATED COLLISION AVOIDANCE

(71) Applicant: Rockwell Automation Technologies, Inc., Mayfield Heights, OH (US)

(72) Inventors: Frederic Boutaud, Lexington, MA (US); Linda A. Freeman, Orlando, FL (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 653 days.

(21) Appl. No.: 16/555,084

(22) Filed: Aug. 29, 2019

(65) Prior Publication Data
US 2021/0064037 A1 Mar. 4, 2021

(51) Int. Cl.
*G05D 1/00* (2006.01)
*G06T 7/73* (2017.01)
(Continued)

(52) U.S. Cl.
CPC ......... *G05D 1/0094* (2013.01); *G05D 1/0088* (2013.01); *G05D 1/0214* (2013.01);
(Continued)

(58) Field of Classification Search
CPC .. G05D 1/0094; G05D 1/0088; G05D 1/0214; G05D 2201/0207; G06T 7/75;
(Continued)

(56) References Cited

U.S. PATENT DOCUMENTS 6,151,539 A    11/2000   Bergholz et al.
7,038,577 B2 *   5/2006   Pawlicki ............... B60W 10/20
                                                            340/436
(Continued)

FOREIGN PATENT DOCUMENTS

JP        2017199401 A    11/2017

OTHER PUBLICATIONS

Francis SLX, Anavatti SG, Garratt M, Shim H. A ToF-Camera as a 3D Vision Sensor for Autonomous Mobile Robotics. International Journal of Advanced Robotic Systems. 2015;12(11). doi:10.5772/61348 (Year: 2015).*

(Continued)

*Primary Examiner* — Krishnan Ramesh
(74) *Attorney, Agent, or Firm* — Amin, Turocy & Watson, LLP

(57) ABSTRACT

A safety system for autonomously mobile machinery (e.g., automated guided vehicles) achieves safety-rated collision avoidance functionality by detecting objects located in the field of view of a three-dimensional (3D) time-of-flight (TOF) vision system or camera. Incorporating a 3D TOF camera into a collision avoidance system allows a large volume to be monitored for object intrusion, improving reliability of object detection. To ensure reliability of the safety system's obstacle detection capabilities, the collision avoidance system also includes self-diagnostic capabilities that verify the accuracy of the TOF camera's distance measurements even in the absence of a test object within the camera's field of view. This is achieved by tilting the TOF camera downward to include the floor within the camera's field of view, allowing the floor to act as a test object that can be leveraged to verify accuracy of the camera's distance measurements.

20 Claims, 22 Drawing Sheets

(51) Int. Cl.
  *G05D 1/02* (2020.01)
  *G06V 20/58* (2022.01)
(52) U.S. Cl.
  CPC ............... *G06T 7/75* (2017.01); *G06V 20/58* (2022.01); *G05D 2201/0207* (2013.01); *G06T 2207/10028* (2013.01)
(58) Field of Classification Search
  CPC .......... G06T 2207/10028; G06V 20/58; G01S 7/4972; G01S 17/42; G01S 17/931; B60W 30/08
  USPC ............................................................. 701/2
  See application file for complete search history.

(56) References Cited

U.S. PATENT DOCUMENTS

| | | | | |
|---|---|---|---|---|
| 9,097,804 | B1* | 8/2015 | Silver | B60W 40/076 |
| 9,176,500 | B1* | 11/2015 | Teller | G05D 1/0088 |
| 10,074,181 | B2 | 9/2018 | Branz et al. | |
| 2001/0031067 | A1* | 10/2001 | Kennedy, Jr. | G06T 7/80 |
| | | | | 382/103 |
| 2010/0235129 | A1 | 9/2010 | Sharma et al. | |
| 2011/0311108 | A1* | 12/2011 | Badino | G06V 20/58 |
| | | | | 382/106 |
| 2012/0083960 | A1* | 4/2012 | Zhu | G05D 1/0055 |
| | | | | 701/23 |
| 2013/0177237 | A1* | 7/2013 | Schamp | G06V 10/421 |
| | | | | 382/154 |
| 2016/0292905 | A1* | 10/2016 | Nehmadi | G06T 7/20 |
| 2018/0227566 | A1 | 8/2018 | Price et al. | |
| 2018/0237006 | A1* | 8/2018 | Ishii | B60W 50/0225 |
| 2019/0180502 | A1* | 6/2019 | England | G06T 15/08 |
| 2019/0220014 | A1* | 7/2019 | Bradley | G06N 20/00 |
| 2019/0324471 | A1* | 10/2019 | Kim | G05D 1/0238 |
| 2021/0035309 | A1* | 2/2021 | Kang | B60W 30/14 |

OTHER PUBLICATIONS

"Products & Solutions for Driverless vehicles & related Technologies" 3D LiDAR sensor—SICK MRS1000—Driverless.global. (Sep. 5, 2017).

Extended European Search Report for European Application No. 20187084.7 dated Dec. 21, 2020, 10 pages.

* cited by examiner

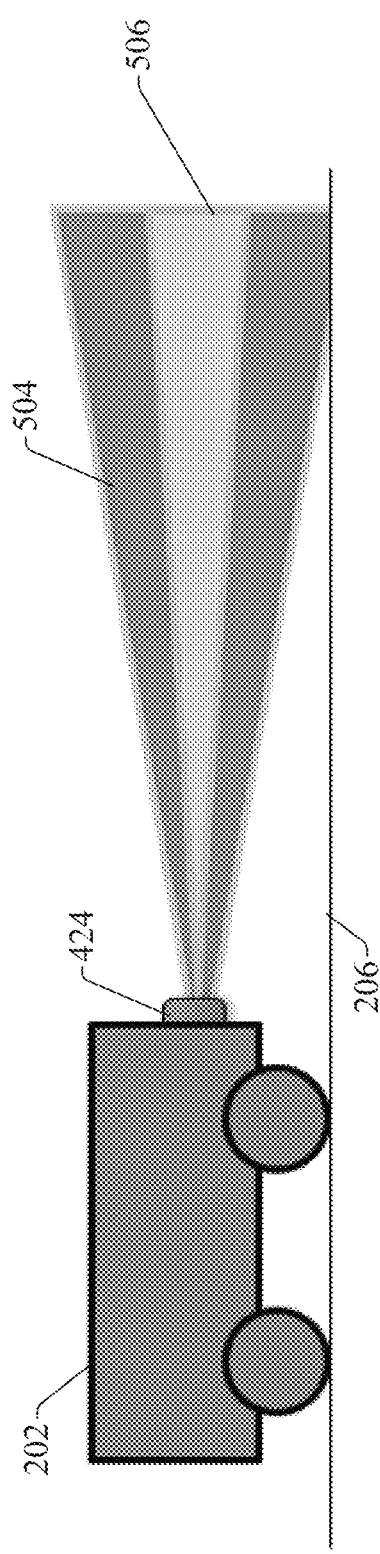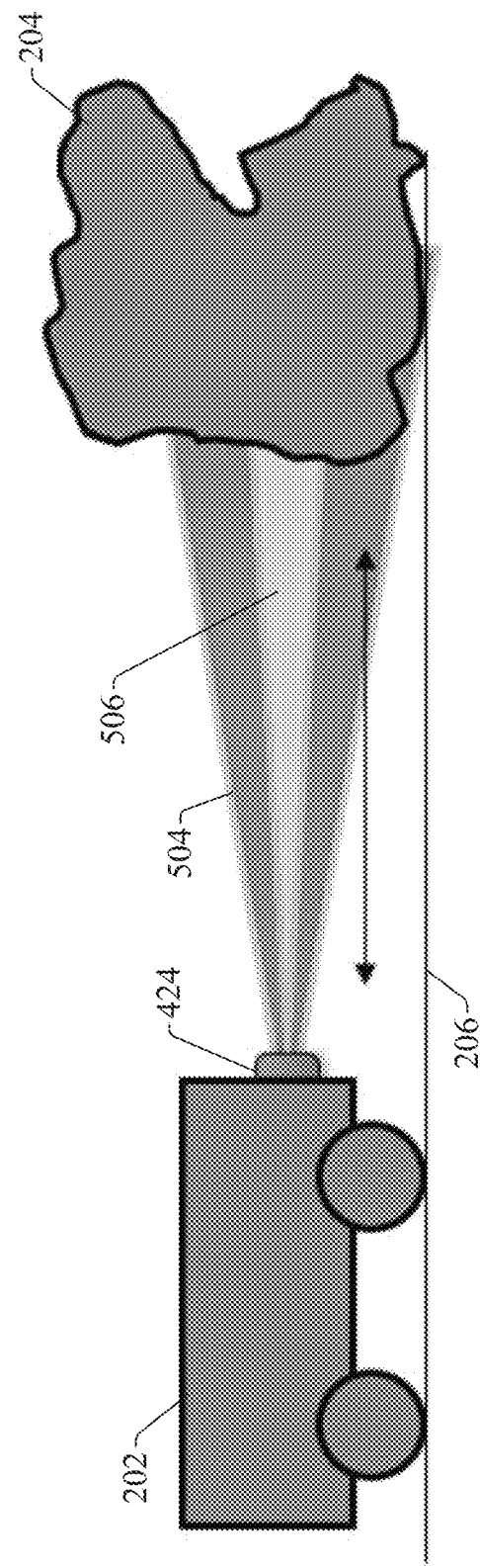

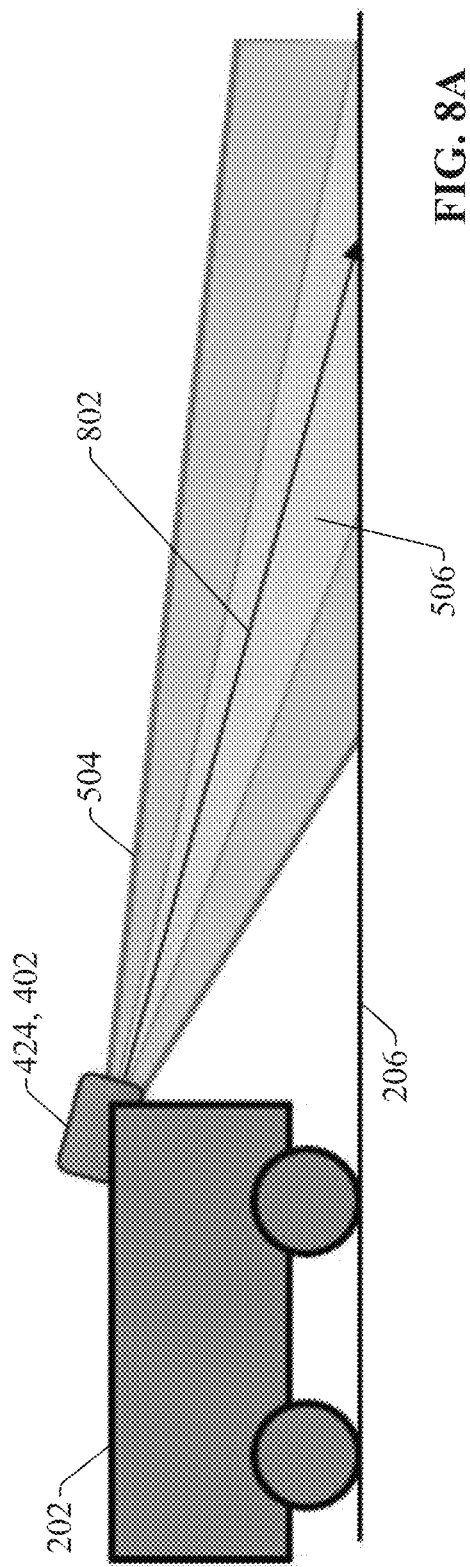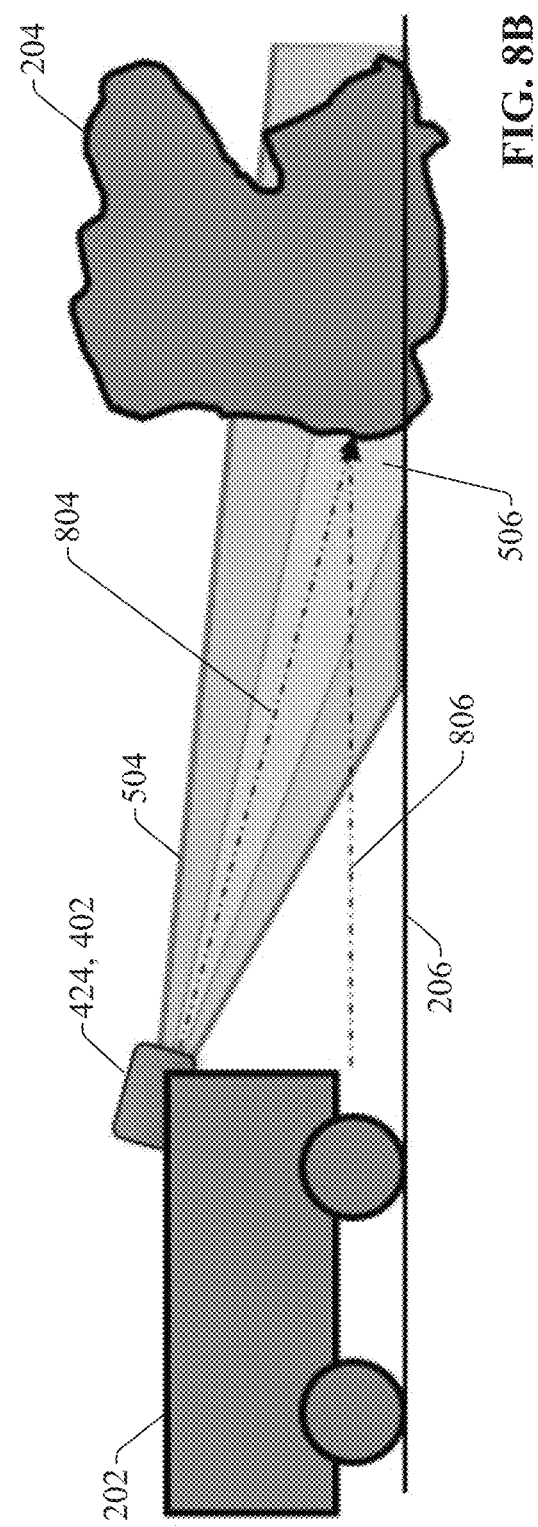

TIME OF FLIGHT SYSTEM AND METHOD FOR SAFETY-RATED COLLISION AVOIDANCE

BACKGROUND

The subject matter disclosed herein relates generally to collision avoidance systems, and, more particularly, to the use of collision avoidance systems in environments requiring high levels of safety reliability.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a collision avoidance system is provided, comprising a three-dimensional camera configured to mount on a front side of a mobile asset at a downward incline that causes a portion of a ground or floor in front of the mobile asset to be included in a field of view of the three-dimensional camera, the three-dimensional camera comprising an emitter component configured to emit light pulses into a space in front of the mobile asset; a photo-sensor component comprising an array of pixels, wherein respective pixels of the array of pixels are configured to convert a subset of the light pulses received from surfaces within the space to electrical energy proportional to the subset of the light pulses received at the pixels; and a distance determination component configured to: determine measured distance values $d_{so}$ associated with the respective pixels based on analysis of the electrical energy, and determine calculated distance values $d_{vo}$ associated with the respective pixels based on the measured distance values $d_{so}$ associated with the respective pixels, field of view angles β of the respective pixels, and an inclination angle α of the three-dimensional camera; and a control output component configured to generate a control output in response to a determination that at least a subset of the calculated distance values $d_{vo}$ satisfy a defined criterion indicative of a presence of an obstacle within a protective field of the three-dimensional camera, wherein the control output is configured to initiate a safety action that alters operation of the mobile asset to mitigate a collision with the obstacle.

Also, one or more embodiments provide a method for automated collision avoidance, comprising emitting, by a three-dimensional camera mounted on a front side of an automated moving machine at a downward tilt, light pulses into a monitored area in front of the automated moving machine, wherein the downward tilt is such that a portion of a ground or floor in front of the automated moving machine is within a field of view of the three-dimensional camera; for respective pixels of a pixel array of the three-dimensional camera, generating, by the three-dimensional camera, electrical energy proportional to a subset of the light pulses received at the respective pixels from surfaces within the monitored area; determining, by the three-dimensional camera, measured distance values $d_{so}$ associated with the respective pixels based on analysis of the electrical energy; determining, by the three-dimensional camera, calculated distance values $d_{vo}$ associated with the respective pixels based on the measured distance values $d_{so}$ associated with the respective pixels, field of view angles β of the respective pixels, and an inclination angle α of the three-dimensional camera; in response to determining that at least a subset of the calculated distance values $d_{vo}$ satisfy a defined criterion indicative of a presence of an obstacle within a protective field of the three-dimensional camera, initiating, by a collision avoidance system comprising a processor, a safety action that alters operation of the automated moving machine to mitigate a collision with the obstacle.

Also, according to one or more embodiments, a non-transitory computer-readable medium is provided having stored thereon instructions that, in response to execution, cause a collision avoidance system comprising a processor to perform operations, the operations comprising emitting light pulses from a three-dimensional camera into a monitored area in front of a mobile asset, wherein the three-dimensional camera is angled downward such that a portion of a ground or floor in front of the mobile asset is within a field of view of the three-dimensional camera; for respective pixels of a pixel array of the three-dimensional camera, generating electrical energy proportional to a subset of the light pulses received at the respective pixels from surfaces within the monitored area; determining measured distance values $d_{so}$ associated with the respective pixels based on analysis of the electrical energy; determining calculated distance values $d_{vo}$ associated with the respective pixels based on the measured distance values $d_{so}$ associated with the respective pixels, field of view angles β of the respective pixels, and an inclination angle α of the three-dimensional camera; and in response to determining that at least a subset of the calculated distance values $d_{vo}$ satisfy a defined criterion indicative of a presence of an obstacle within a protective field of the three-dimensional camera, initiating a safety action that alters operation of the mobile asset to mitigate a collision with the obstacle.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 5A is a diagram illustrating an AGV equipped with a 3D TOF camera for object detection purposes.

FIG. 5B is a diagram depicting detection of an obstacle by a TOF camera mounted to an AGV.

FIG. 8A is a diagram illustrating an AVG having a front-mounted 3D TOF camera that is inclined toward the floor such that a portion of the floor is within the protective field of the camera.

FIG. 8B is a diagram illustrating detection of an obstacle in the path of an AGV when the TOF camera is inclined downward.

DETAILED DESCRIPTION

Figure 1:
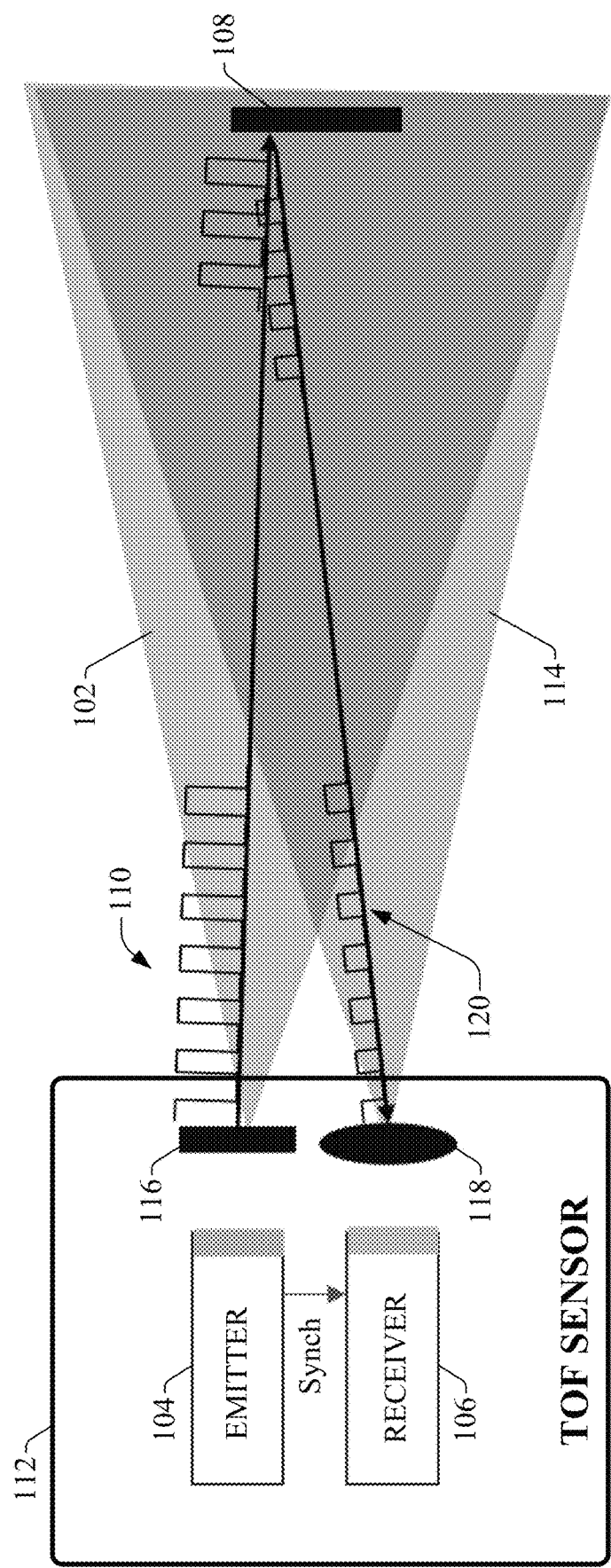
FIG. 1 is a generalized block diagram of a TOF sensor illustrating pulsed light time of flight principles.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many technologies exist for detecting distances of objects or surfaces within a monitored space. These include, but are not limited to, time of flight (TOF) optical sensors or other types of three-dimensional sensors—such as photo detectors or multi-pixel image sensors—which are used to detect distances of objects or surfaces within a viewing range of the sensor. These optical sensors can include, for example, photo detectors that measure and generate a single distance data point for an object within range of the detector, as well as multi-pixel image sensors comprising an array of photo-detectors that are each capable of generating a distance data point for a corresponding image pixel. Some three-dimensional optical sensors, such as stereo vision technology (for a passive sensor) or structured light technology (for active sensor) measure distances using triangulation.

Some types of TOF sensors that employ pulsed light illumination measure the elapsed time between emission of a light pulse to the viewing field (or viewing space) and receipt of a reflected light pulse at the sensor's photo-receiver. Since this time-of-flight information is a function of the distance of the object or surface from the sensor, the sensor is able to leverage the TOF information to determine the distance of the object or surface point from the sensor.

FIG. 1 is a generalized block diagram of a TOF sensor 112 illustrating pulsed light time of flight principles. The TOF sensor 112 includes an illumination light source—represented by emitter 104 and associated illumination optics 116 in FIG. 1—that projects light 102 modulated with pulses 110. The space encompassed by the projected modulated light 102 represents the field of illumination (FOI). Objects and surfaces within the viewing field, such as object 108, reflect part of the pulses' radiation back to the TOF sensor's imaging lens 118, which directs the received pulses 120 to pixels of receiver 106 (e.g., a photo-detector or a photo-sensor such as a photo-diode). A subset of the modulated light 114—including reflected pulses 120—is scattered by objects and surfaces in the scene, and a portion of this scattered pulsed illumination is received at the TOF sensor's imaging lens 118 and associated receiver 106 (e.g., light photo-detectors). Receiver 106 can include, for example, a dedicated multi-pixel CMOS (complementary metal oxide semiconductor) application-specific integrated circuit (ASIC) imager that integrates specialized means for measuring the position in time of received pulses 120. In general, the sensing technology used by some TOF sensors measures the time taken by a light pulse to travel from the sensor's illumination light source to an object 108 or surface within the viewing field and back to the sensor's light photo-detectors. Distance measurement components can measure the distance d to the object 108 as $$d = (\tfrac{1}{2})ct \qquad (1)$$

where c is the speed of light, and t is the measured time of the round trip for the pulse from the emitter 104 to the object 108 and back to the receiver 106.

Since the speed of light c is a known constant and the time t elapsed between emission and reception of the pulse 110 can be measured, the TOF sensor's distance measuring components can determine, for each pixel of the receiver 106, the distance between the object 108 and the sensor by calculating half of the round-trip distance, as given by equation (1) above. Collectively, the distance information obtained for all pixels of the viewing space yields depth map or point cloud data for the viewing space. In some implementations, the TOF sensor's distance measurement components can include a timer that measures the arrival time of a received pulse relative to the time at which emitter 104 emitted the pulse, or may include demodulation circuitry that determines the measured time of the pulse's round trip by comparing the phase of the received pulse with its corresponding emitted pulse. In general, the TOF sensor 112 generates information that is representative of the position in time of the received pulse.

Each pixel of the captured image has an associated photo-receiver or photo-detector. When radiation of a reflected pulse 120 is incident on the photo-receivers or photo-detectors that make up sensor 112, the incident light is converted into an electrical output proportional to the intensity of the incident light. The distance measurement components can then recover and analyze the electrical output in order to identify the pulse, thereby determining that the reflected pulse has been received at the receiver 106.

In some implementations, the sensor's emitter 104 may emit a burst of pulses into the scene for a given measuring sequence and perform the distance measurement based on an accumulation of multiple received pulses reflected back to the sensor. The photo-detectors of receiver 106 can accumulate electrical charges based on the exposure duration of the receiver 106 to the received light pulse radiation relative to a time reference. The accumulated charges on a given photo-detector translate into a voltage value that, evaluated over time, defines a demodulated pulse waveform that is recognizable by the distance measurement components. Once the pulse is identified in this manner, the TOF sensor 112 can estimate the time that the reflected pulse was received at the photo-detector relative to the time that the pulse was emitted (e.g., based on phase shift analysis or other types of analysis performed on the pulse waveform), and the distance associated with the corresponding pixel can be estimated based on this time using equation (1) (or another distance determination equation or algorithm that defined distance as a function of light pulse propagation time).

Figure 2:
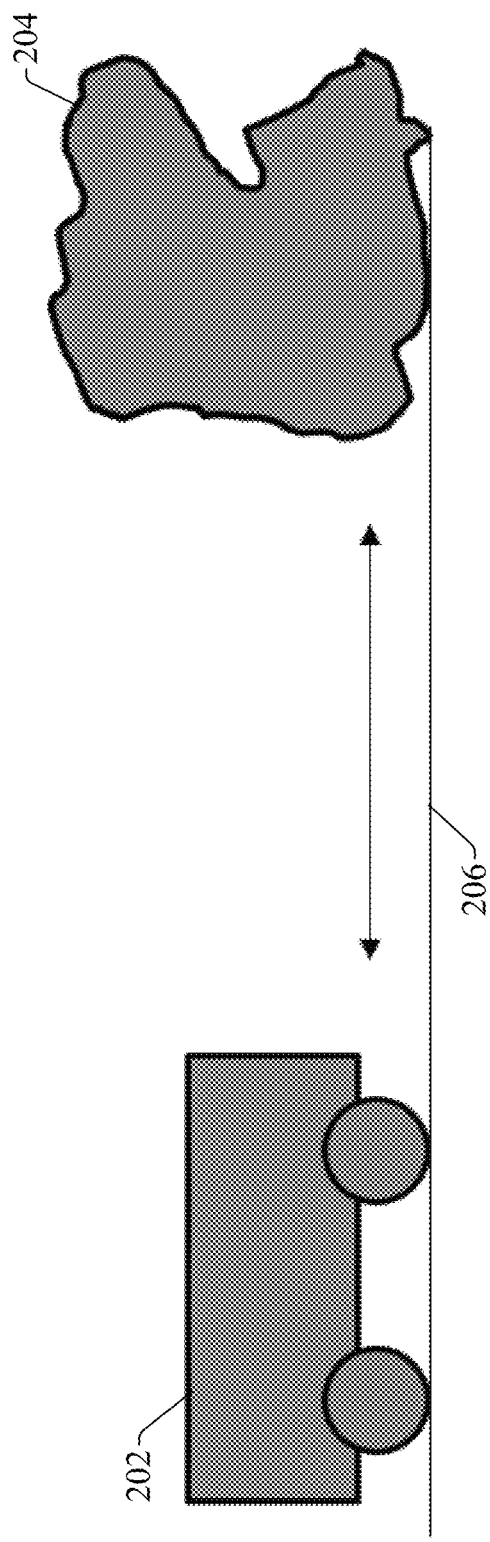
FIG. 2 is a diagram illustrating an AGV approaching an obstacle.

If a TOF sensor's distance calculation capabilities are sufficiently reliable, the sensor can serve as an industrial safety device for an industrial safety system. In an example implementation illustrated in FIG. 2, TOF-based detection systems can be installed on automated guided vehicles (AGVs) 202 or other types of automated or autonomous mobile equipment to facilitate detection of people or obstacles 204 in the path of the vehicle, which can cause the AGV 202 to initiate a collision avoidance response (e.g., by deviating its planned path to avoid the obstacle 204, by slowing its travel, or by stopping). Such collision avoidance systems can be implemented in diverse types of AGVs 202, autonomous mobile robots (AMRs), or other types of autonomous or guided mobile assets or platforms, including but not limited to automated warehouse vehicles used to transport products or materials, automated cars, autonomous amusement park rides, or other such applications.

Figure 3A:
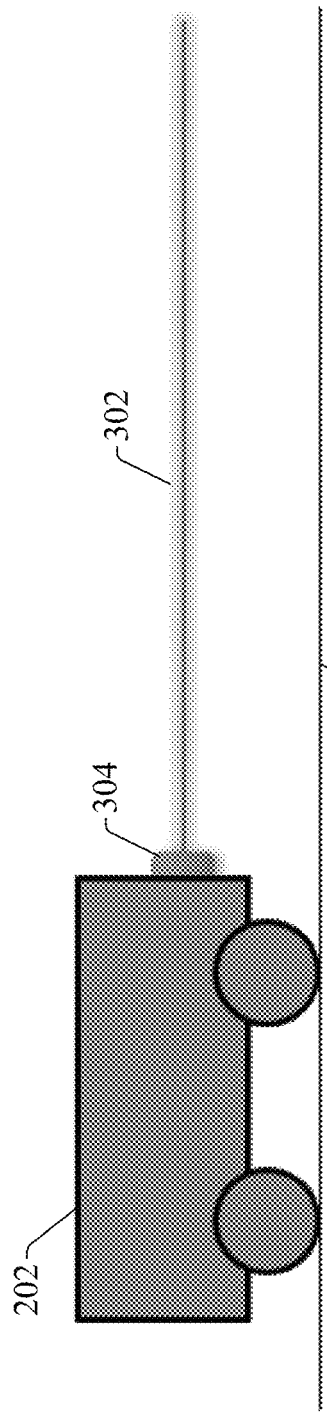
FIG. 3A is a diagram illustrating an AGV equipped with a 2D laser scanner that projects a wide, flat light beam into the space in front of the AGV.

In some cases, TOF-based collision detection systems may use two-dimensional (2D) laser scanner devices or 2D light detecting and ranging (Lidar) systems to detect obstacles 204. FIG. 3A is a diagram illustrating an AGV 202 equipped with a 2D laser scanner 304 that projects a wide, flat light beam 302 into the space in front of the AGV 202 (the wide flat beam 302 is depicted from the side in FIG. 3A, and so is seen as a line). Some 2D laser scanners 304 may create the wide flat beam 302 by sweeping a narrow beam across the area in front of the AGV 202 in an oscillatory manner to collect line-wise distance data. Alternatively, the 2D laser scanner may project a stationary, substantially planar beam 302 across the area in front of the AGV 202 and collect distance data for objects that pass through the beam 302.

Figure 3B:
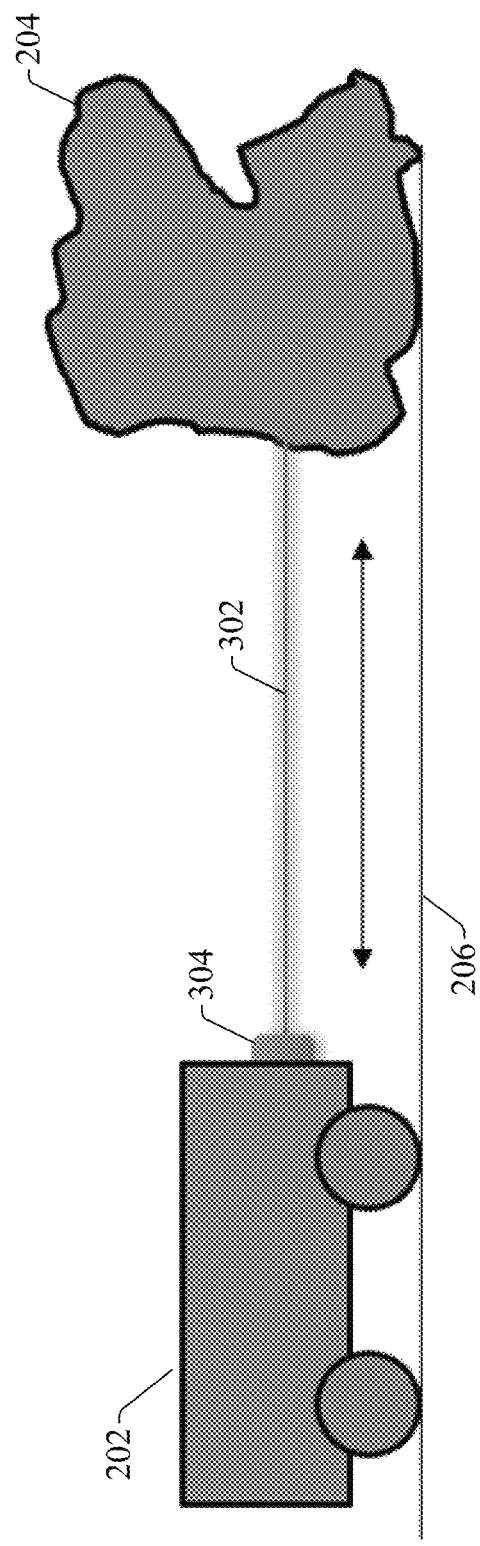
FIG. 3B is a diagram illustrating detection of an obstacle in front of the AGV using a 2D laser scanner.

FIG. 3B is a diagram illustrating detection of an obstacle 204 in front of the AGV 202 using scanner 304. When the projected beam is incident on an obstacle 204 in the path of AGV 202 the reflected modulated light returned to the scanner's sensing circuitry is analyzed to determine a distance of the obstacle 204 from the AGV 202. If the safety system determines that this distance is found to be less than a defined safe distance, the system may initiate a collision avoidance action, such as causing the AGV 202 to stop or to divert its planned path of travel to avoid the obstacle. In the example depicted in FIG. 3B, the obstacle 204 is located in front of the scanner 304 with an approach (represented by the arrow) parallel to the scanning plane of beam 302. When the measured distance between the obstacle 204 and the AGV 202 is smaller than a defined threshold, a signal is triggered indicating that the obstacle 204 is intruding into the protective field of the scanner 304. In the case of 2D scanners, the protective field is defined as a plane parallel to the floor 206 and therefore parallel to the direction of approach between the AGV 202 and the obstacle 204.

TOF-based collision detection systems that use 2D laser scanners 304 have a number of drawbacks that limit their utility in crucial safety applications. For example, the field of view—and thus the visibility—of a 2D scanner 304 is limited due to the flat planar shape of the beam 302. Moreover, the safety integrity level (SIL) rating for detection systems using 2D laser scanners 304 typically cannot exceed SIL 2 with a performance level (PL) of PLd. This level of safety reliability is insufficient for many safety applications, which require a safety integrity of at least SIL 3 with a performance level of PLe.

As a related consideration, safety systems and their associated detection devices must remain in reliable working order and meet requirements that guarantee the safe operation of their associated protected systems (e.g., AGVs). In general, the system is considered unsafe if system failures result in hazards going undetected (i.e., failing to danger), or if the system is not capable of performing to requirements without going into a safe state. Safety system failures or measurement inaccuracies should be detected automatically, and corrective measures carried out, to ensure that such failures do not result in injury or damage.

To address these and other issues, one or more embodiments described herein provide a safety system and method capable of achieving safety-rated collision avoidance functionality for mobile equipment (e.g., AGVs or other types of mobile machines, including autonomous vehicles or driving assistance systems) by detecting objects located in the field of view of a three-dimensional (3D) TOF vision system or camera. Relative to a 2D scanner, incorporating a 3D TOF camera into a collision avoidance system allows a larger volume to be monitored for object intrusion, improving reliability of object detection. To ensure reliability of the safety system's obstacle detection capabilities, the collision avoidance system also includes self-diagnostic capabilities that verify the accuracy of the TOF camera's distance measurements even in the absence of a test object within the camera's field of view. These self-diagnostic capabilities can further improve the safety rating of the collision avoidance system.

Figure 4:
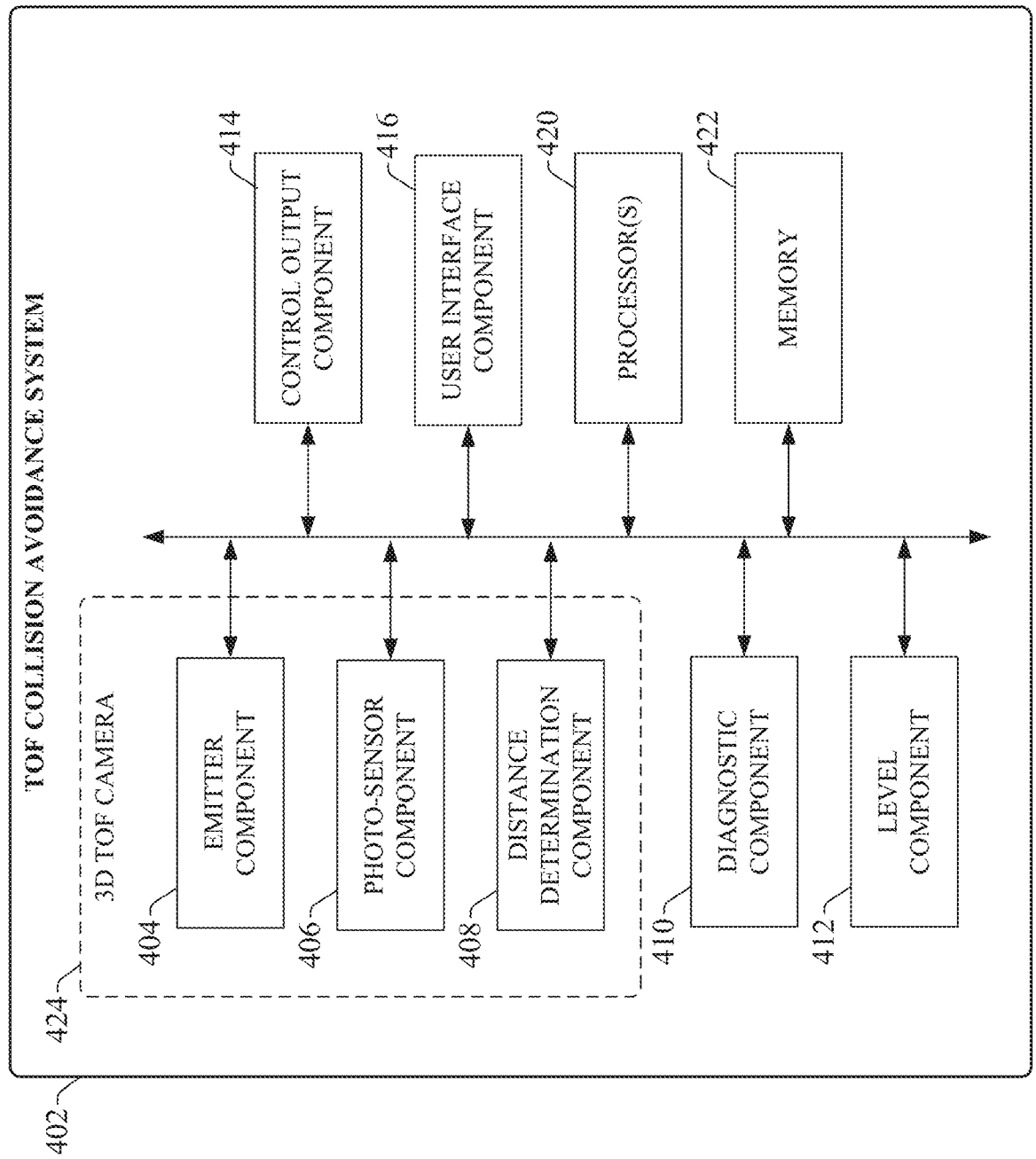
FIG. 4 is a block diagram of an example time-of-flight (TOF) collision avoidance system.

FIG. 4 is a block diagram of an example TOF collision avoidance system 402 according to one or more embodiments of this disclosure. Although FIG. 4 depicts certain functional components as being integrated on a common platform with shared processor and memory, it is to be appreciated that one or more of the functional components illustrated in FIG. 4 may reside on a separate platform relative to system 402 in some embodiments. Also, although the subject collision detection techniques are described herein in connection with TOF sensor devices, it is to be appreciated that the collision detection techniques described herein can be implemented in other types of 3D sensors that are capable of generating a distance map or point cloud data. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF collision avoidance system 402 can include an emitter component 404, a photo-sensor component 406, a distance determination component 408, a diagnostic component 410, a level component 412, a control output component 414, a user interface component 416, one or more processors 420, and memory 422. In various embodiments, one or more of the emitter component 404, photo-sensor component 406, distance determination component 408, diagnostic component 410, level component 412, control output component 414, user interface component 416, the one or more processors 420, and memory 422 can be electrically and/or communicatively coupled to one another to perform one or more of the functions of the TOF collision avoidance system 402. In some embodiments, one or more of components 404, 406, 408, 410, 412, 414, and 416 can comprise software instructions stored on memory 422 and executed by processor(s) 420. TOF collision avoidance 402 may also interact with other hardware and/or software components not depicted in FIG. 4. For example, processor(s) 420 may interact with one or more external user interface devices, such as a keyboard, a mouse, a display monitor, a touchscreen, or other such interface devices. TOF collision avoidance system 402 may also include network communication components and associated networking ports for sending data generated by any of components 404, 406, 408, 410, 412, 414, and 416 over a network (either or both of a standard data network or a safety network), or over a backplane.

In some embodiments, collision avoidance system 402 may comprise a 3D TOF camera 424 comprising the emitter component 404, photo-sensor component 406, and distance determination component 408. Emitter component 404 can be configured to control emission of light by the 3D TOF camera 424. In this regard, TOF camera 424 may include a laser or light emitting diode (LED) light source under the control of emitter component 404. Emitter component 404 can generate pulsed light emissions directed to the monitored space so that time-of-flight information for the reflected light pulses can be generated by the TOF camera 424 (e.g., by the distance determination component 408).

Photo-sensor component 406 can be configured to convert light energy incident on a photo-receiver or photo-detector array to electrical energy for respective pixels of a monitored space, and measure this electrical energy for the purposes of pulse identification and distance analysis. In some embodiments, photo-sensor component 406 can selectively control the storage of the converted electrical energy in various electrical storage components (e.g., measuring capacitors) for subsequent pulse waveform identification and distance analysis. Distance determination component 408 can be configured to determine a propagation time (time of flight) of emitted light pulses received at respective pixels based on the stored electrical energy generated by the photo-sensor component 406, and to further determine a distance value of an object or surface corresponding to a pixel within the viewing space based on the determined propagation time.

Diagnostic component 410 can be configured to execute a diagnostic sequence that verifies the accuracy of distance values measured and reported by the 3D TOF camera 424. This diagnostic sequence can involve measuring test distances to points on the ground or floor within the camera's field of view and comparing these measured values with expected distances corresponding to these points.

Level component 412 can be configured to measure a direction and degree of inclination of an AGV or other mobile equipment on which system 402 is mounted, and adjust the protective field of the TOF camera 424 to compensate for the measured inclination, ensuring that measurements of distances to obstacles in front of the AGV remain accurate even if the AGV is traversing uneven terrain.

Control output component 414 can be configured to control one or more sensor outputs based on results generated by the distance determination component 408 and diagnostic component 410. This can include, for example, sending an analog or digital control signal to a control or supervisory device (e.g., an on-board computer mounted in the AGV or other mobile machinery, etc.) to perform a control action, initiating a safety action (e.g., stopping an AGV, altering a path of the AGV, removing power from the AGV, etc.), initiating a notification (e.g., an audible or visual signal), or other such actions.

User interface component 216 can be configured to receive user input and to render output to the user in any suitable format (e.g., visual, audio, tactile, etc.). In some embodiments, user interface component 214 can be configured to communicate with a graphical user interface (e.g., a programming or development platform) that executes on a separate hardware device (e.g., a laptop computer, tablet computer, smart phone, etc.) communicatively connected to system 402. In such configurations, user interface component 416 can receive input parameter data entered by the user via the graphical user interface, and deliver output data to the interface. Input parameter data can include, for example, protective field definition data, normalized pulse shape data that can be used as reference data for identification of irregularly shaped pulses, light intensity settings, minimum safe distances or other distance threshold values to be compared with the measured distance values for the purposes of determining when to initiate a collision avoidance action, or other such parameters. Output data can comprise, for example, status information for the collision avoidance system 402 in general or the TOF camera 424 in particular, alarm or fault information, parameter settings, or other such information.

The one or more processors 420 can perform one or more of the functions described herein with reference to the systems and/or methods disclosed. Memory 422 can be a computer-readable storage medium storing computer-executable instructions and/or information for performing the functions described herein with reference to the systems and/or methods disclosed.

FIG. 5A is a diagram illustrating an AGV 202 equipped with a 3D TOF camera 424 for object detection purposes. FIG. 5B is a diagram depicting detection of an obstacle 204 by the TOF camera 424. As an alternative to the 2D scanner 304 discussed above in connection with FIGS. 3A and 3B, a 3D collision avoidance system 402 implemented by a multi-pixel TOF camera 424 can detect the presence of an obstacle 204 relative to a protective field 506 defined as a volume (as opposed to the plane of a 2D scanner 304). The TOF camera's emitter component 404 emits pulsed light into the field of view of the camera 424, and the obstacle 204 is based on measurement of light back-refracted from the obstacle 204 and received on multiple pixels of the camera's photo-sensor component 406. In the example depicted in FIGS. 5A and 5B, the protective field 506 to be monitored for intrusions is set to be narrower than the camera's total field of view encompassed by emitted beam 504. In some embodiments, the dimensions or boundaries of the protective field 506 to be monitored for intrusions can be configured by a user (e.g., via user interface component 416).

Figure 6:
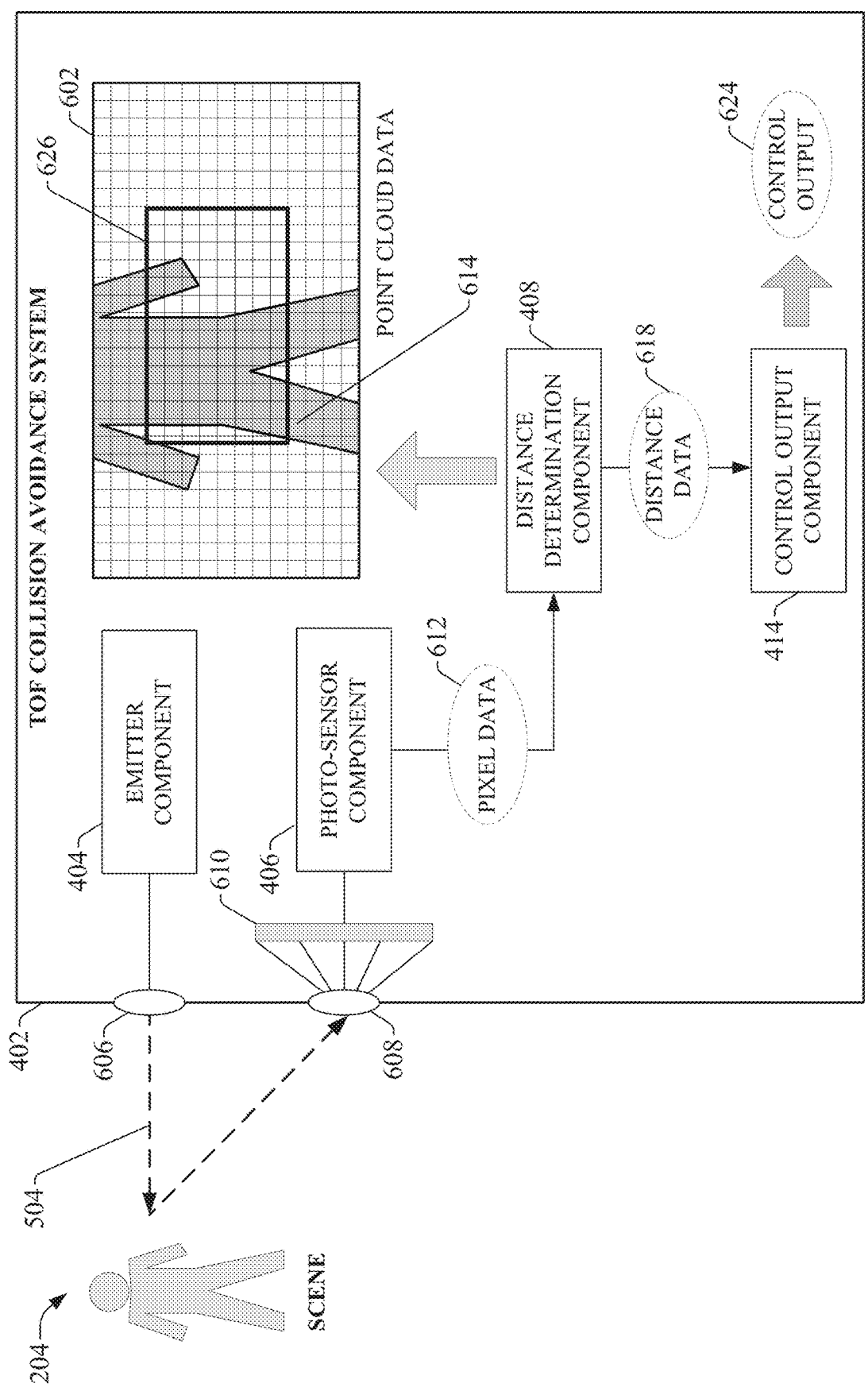
FIG. 6 is a block diagram illustrating components of a TOF collision avoidance system.

FIG. 6 is a block diagram illustrating components of TOF collision avoidance system 402 according to one or more embodiments. Although examples described herein assume that collision avoidance system 402 is mounted on an AGV, it is to be appreciated that the object detection and diagnostic features described herein are applicable for use with other types of automated or autonomous moving equipment, including but not limited to AMRs, automated warehouse vehicles, automated cars, autonomous amusement park rides, or other such mobile equipment. Embodiments of collision avoidance system 402 can also be implemented in non-autonomous vehicles as part of a driving assistance system. In such embodiments, the collision avoidance system 402 can be configured to generate alerts in response to determining that a driver is at risk of colliding with an obstacle, or to assume a degree of automated control from the driver in order to mitigate a risk of collision with an obstacle.

In the example implementation depicted in FIG. 6, emitter component 404 emits a pulsed light beam 504 to a scene in front of the AGV 202 (e.g., via emitting lens element 606). Light pulses are reflected from the objects and surfaces within the scene, and the reflected light is received at a receiving lens element 608 and directed to a photo-receiver array 610 associated with photo-sensor component 406, which generates pixel data 612 for the scene. In some implementations, pixel data 612 can comprise measured voltage values—or sets of voltage values—measured for respective pixels of the camera's pixel array, where the voltage values are indicative of the presence and phase of reflected pulses received by the pixels.

The pixel data 612 is provided to distance determination component 408, which computes distance values for each pixel 614 of the resulting image based on the pixel data 612 (e.g., based on equation (1) or a variation thereof), resulting in distance data 618. This results in a point cloud 602 for the image, which represents the array of measured distance values corresponding to the array of pixels 614 that make up the image. The distance value of a given pixel 614 represents a distance of a point on an object or surface corresponding to that pixel from the TOF camera 424. The distance values for all pixels 614 of the image yields the point cloud 602 for the image. The point cloud distances are provided to control output component 414 as distance data 618. If the distance data 618 indicates that an obstacle 204 (e.g., a person in the example depicted in FIG. 6) is located within a protective distance from the camera 424 (that is, within the protective field defined for the camera 424), the control output component 414 generates a control output 624 directed to the control system of the AGV 202 that initiates a safety action (e.g. rerouting of the AGV's path, slowing or stopping of the AGV, etc.).

As noted above, in some embodiments the protective field 506 to be monitored for intrusions by camera 424 can be configured by a user via user interface component 416. In one or more example embodiments, the user interface component 416 can generate and render configuration displays on a client device that allow a user to define the protective field 506 in terms of a selected section 626 of the total point cloud 602 or image whose distances are to be analyzed for possible obstacles, as well as minimum safe distances (i.e., the protective distance) for the pixels within this section 626. In this regard, the selected section 626 of the point cloud 602 represents the x-y boundaries of the protective field 506, while the minimum safe distances represent the z-axis limits of the protective field. Based on this configuration, control output component 414 will generate control output 624 based on a determination of whether a sufficient number of the subset of pixels 614 that make up the selected section 626 have distance values that are less than the defined minimum safe distance. As will be described in more detail below, some embodiments of system 402 can automatically adjust the location or direction of the protective field 506 in response to detected conditions.

Figure 7:
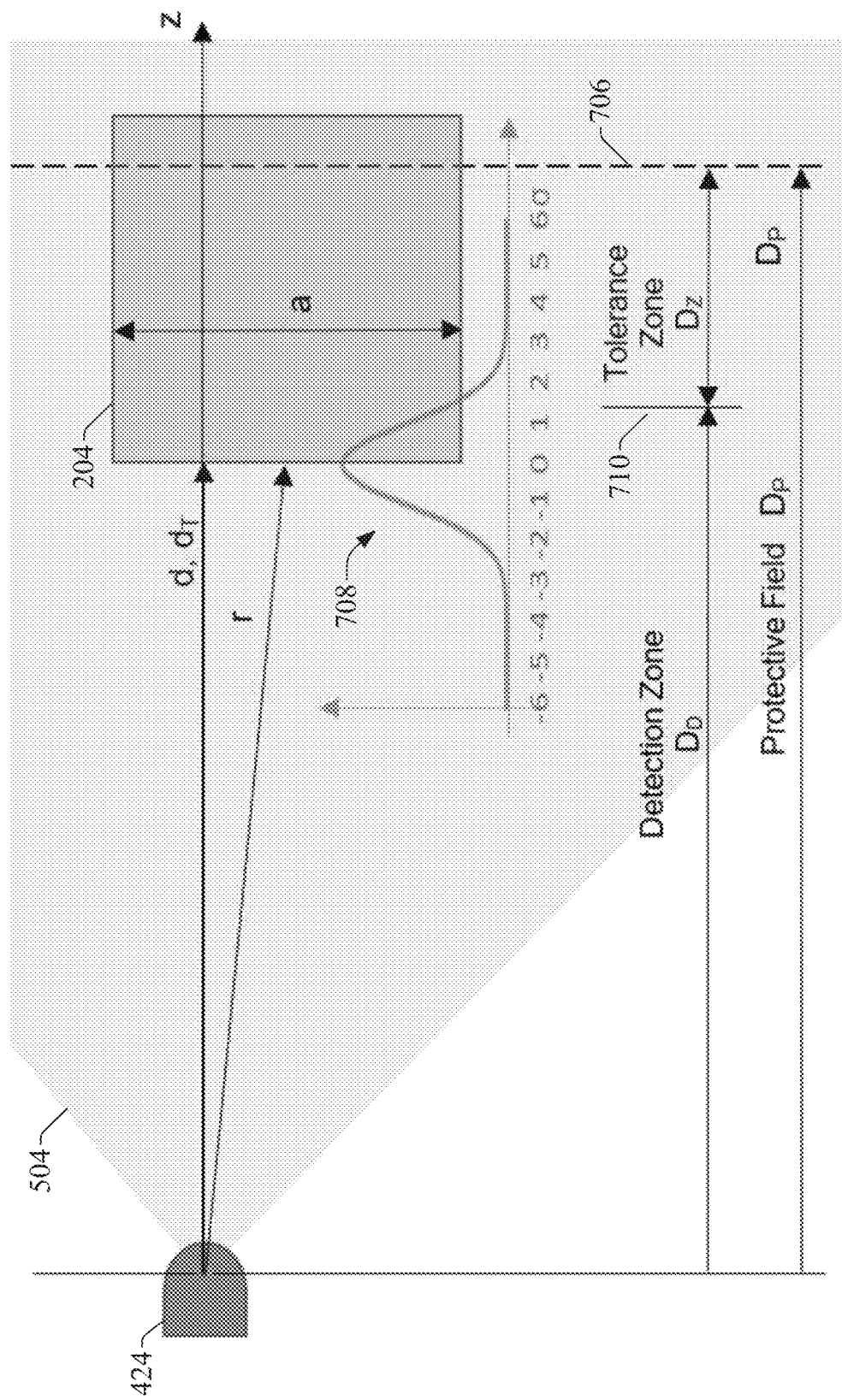
FIG. 7 is a diagram illustrating detection of an example cubical obstacle by embodiments of a TOF camera.

FIG. 7 is a diagram illustrating detection of an example cubical obstacle 204 by embodiments of TOF camera 424. As discussed above, the emitter component 404 of TOF camera 424 emits a series of light pulses into the field of view as beam 504 and the photo-sensor component 406 receives returned light pulses reflected from the field of view, including light pulses reflected from obstacle 204. Distance determination component 408 analyzes the voltage values captured by the photo-sensor component 406 in response to the reflected light pulses incident on the subset of pixels corresponding to obstacle 204 to estimate total propagation times for of the pulses received at the pixels, and translates these propagation times to estimated distances of obstacle 204 from the respective pixels (e.g., based on equation (1) above or a variation thereof).

One pixel of the TOF camera's photo-detector observes a portion of obstacle 204 located in that pixel's field of view and captures the optical energy from a light pulse reflected from the obstacle 204 necessary to calculate the distance of the obstacle 204 from the camera 424 (and thus from the AGV 202). The obstacle detection and self-diagnostic techniques described herein are not dependent upon any particular technique used by the TOF camera 424 to translate incident optical energy into pixel-level distance information for an obstacle in the field of view.

Control output component 414 performs intrusion detection by comparing a measured distance d of obstacle 204 with a defined threshold distance $D_P$ representing the limit of the protective field (the protected area) being monitored by the collision avoidance system 402. Threshold distance $D_P$-representing a minimum safe distance—can be configured by a user (e.g., via user interface component 416) based on the needs of the safety application within which system 402 is being used (e.g., the relative level of hazard posed by the AGV 202, the speed of the AGV 202 during normal operation, etc.). For example, threshold distance $D_P$ can be set to correspond to a determined minimum safe distance from the AGV 202, taking into account the AGV's speed or stopping time. When control output component 414 determines that the distance d of obstacle 204 is less than the threshold distance $D_P$ (that is, when d<$D_P$), the obstacle 204 is determined to be within the protective field. In some applications, in response to detection of an obstacle 204 within the protective field (that is, when the measured distance d is determined to be less than the distance $D_P$ of the protective field boundary), the control output component 414 can initiate a defined safety action to mitigate a potential collision between the AGV 202 and the obstacle 204 (e.g., by re-routing, slowing, or stopping the AGV 202).

In FIG. 7, variable d represents the measured distance of obstacle 204 determined by distance determination component 408, while $d_T$ represents the true distance of obstacle 204 from the AGV 202. The limit or boundary of the protective field 506 is defined as a plane 706 perpendicular to the central sensing axis z of the TOF camera 424, and the distance of that boundary plane 706 to the sensor is $D_P$. An obstacle 204 is inside the protective field 506 (see FIGS. 5A and 5B) if its true distance $d_T$ is smaller than the threshold distance $D_P$. In the example scenario depicted in FIG. 7, the distance of a point to the TOF camera 424 is defined as a point coordinate on the z-axis, which is different than point-to-point distance, such as radial distance r.

The distance $D_P$ of the protective field 506 can be viewed as the sum of a detection zone distance $D_D$ and a tolerance zone distance $D_Z$. With the intrusion detection criterion being defined as d<$D_P$, the probability of detection must be guaranteed if the obstacle 204 is at the boundary of the detection zone—located at a distance $D_D$ from the TOF camera 424—or intruding somewhat into the detection zone.

Also included in FIG. 7 is an example probability distribution curve 708 of the measured distance d of the obstacle 204. The tolerance zone, represented by the distance $D_z$ between the detection zone boundary 710 and the protective field boundary plane 706, is set to guarantee high probability of detection, such that that the measured distance d is unlikely to be greater than $D_P$=($D_D$+$D_z$) for an obstacle 204 located in the field (that is, when the true object distance $d_T$ is less than or equal to ($D_D$-$D_1$), the measured distance d should not indicate that the obstacle 204 is outside the protective field). As an example of a normal distribution of the measured distance, a value of the tolerance zone distance $D_Z$ greater than 5σ guarantees, for $d_T$=<$D_D$, a measured distance d smaller than $D_P$ with a probability above a required level of 1-2.9.10$^{-7}$.

A 3D TOF camera 424 can offer greater reliability of obstacle detection relative to a 2D scanner since the 3D TOF camera's total available field of view is often larger than the protective field 506 that must be monitored for a given collision avoidance system. In contrast to monitoring for presence of obstacles 204 within the flat plane of a 2D scanner, a 3D TOF camera 424 can be configured to monitor a volume of space in front of the AGV 202 capable of detecting obstacles 204 across a greater range of approach angles.

As noted above, the safety rating for an industrial safety system (including the collision avoidance systems described herein) can be improved if the system is implemented with diagnostics that verify faultless operation of crucial components of the safety system, and is capable of performing a safety action if a system failure or measurement inaccuracy is detected. Ideally, such diagnostics should be performed automatically at regular intervals, and should verify the integrity of both the illumination path and the imaging path. This includes verifying that the distance measurement components—e.g., photo-sensor component 406, distance determination component 408, photo-receiver array 610, etc.—are producing accurate distance values for each pixel. According to one diagnostic approach for verifying distance measurement accuracy, a test measurement sequence can be performed using an object at a known distance from the 3D TOF camera 424. The camera can measure distance values for the object, and these measured distance values can then be compared with expected distance value to determine whether the actual measurements align with the expected distances. This approach can confirm correct operation of detection and measurement components along the return path of reflected light received at the camera 424, including optical elements, sensing elements, and computational components that make up the system 402.

However, if the 3D TOF camera 424 is directed such that beam 504 is projected forward as shown in FIGS. 5A and 5B, there is no fixed object within the camera's protective field 506 during default scenarios (e.g., the scenario depicted in FIG. 5A) that can be used as a test object for verifying correct operation of the collision avoidance system's distance measurement components. In the absence of such a test object, no light from the field in front of the AGV 202 is returned to the camera 424, no diagnostic distance value can be generated, and accuracy of the system's distance measurement capabilities cannot be verified.

To address this issue, the 3D TOF camera 424 can be inclined toward the floor 206 so that a portion of the floor 206 is within the camera's protective field 506, as illustrated in FIG. 8A. By directing the camera 424 in this manner, beam 504 is incident on the ground or floor 206, which reflects a portion of the light back to the camera's sensing components. Thus, the ground or floor 206 provides a return light path that can be used during diagnostic sequences for verifying correct operation of the system's imaging components.

In the case of the multi-pixel 3D TOF camera 424 used in the present collision avoidance system 402, each pixel having the ground or floor 206 in its field of view will generate a distance value corresponding to the point on the floor 206 seen by that pixel. This distance value represents the distance 802 from the TOF camera 424 to the floor 206 along the optical axis of the pixel.

FIG. 8B is a diagram illustrating detection of an obstacle 204 in the path of the AGV 202 when the TOF camera 424 is inclined downward as shown in FIG. 8A. If an obstacle 204 enters the protective field 506 of the 3D TOF camera 424, distance determination component 408 can distinguish between the distance 804 from the camera 424 to the obstacle 204 (that is, the distance from a given camera pixel to the obstacle 204 along the pixel's optical axis) and the horizontal distance 806 from the AGV 202 to the obstacle 204. Specifically, distance determination component 408 can derive the horizontal distance 806 between the AGV 202 and the obstacle 204 based on the measured distance 804 between the camera 424 and the obstacle 204 along the camera's optical path, and the control output component 414 can use this calculated distance 806 to determine whether a control output 624 should be generated.

Figure 9:
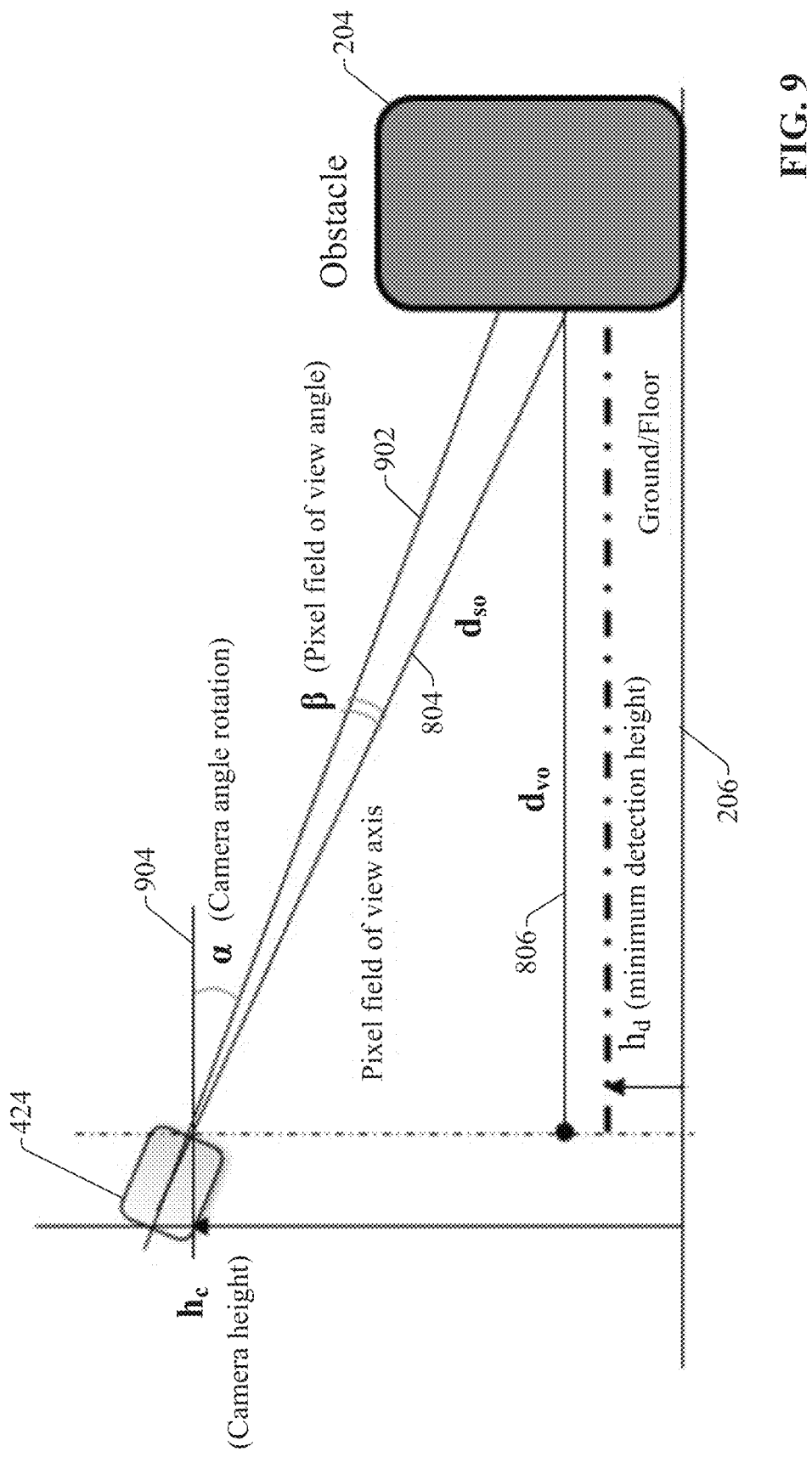
FIG. 9 is a diagram illustrating an approach carried out by a distance determination component for calculating a distance when a TOF camera mounted on an AGV is inclined downward.

FIG. 9 is a diagram illustrating an approach carried out by the distance determination component 408 for calculating the distance 806 when camera 424 is inclined as illustrated in FIGS. 8A and 8B. In this example, the minimum safe distance (threshold distance $D_P$ of FIG. 7) of the camera's protective field 506 is defined in terms of the horizontal distance 806 between the AGV 202 and a given obstacle 204. This distance is given as $d_{vo}$ in FIG. 9 (although distance 806 is referred to as being a horizontal distance 806 in the case of a perfectly horizontal floor 206, more generally distance 806 is considered a distance between the AGV 202 and the obstacle 204 along a line substantially parallel to a slope of the floor 206). Control output component 414 will generate a control output 624 initiating a safe action in response to determining that distance $d_{vo}$ is less that this minimum safe distance. The measured distance 804 between a pixel of the 3D TOF camera 424 and the obstacle 204 along the optical axis (or field view axis) of the pixel is given as $d_{so}$ in FIG. 9. The field of view angle β represents the angle between the pixel's optical axis and the upper boundary 902 of the camera's total field of view.

The difference between distance 804 and distance 806 depends on the rotation or inclination angle α of the TOF 3D camera 424 relative to the horizontal 904. The rotation angle α also determines the maximum and minimum distance range within which an obstacle 204 can be detected.

During normal operation, camera 424 projects the pulsed light beam 504 ahead of AGV 202 (as shown in FIGS. 8A and 8B), tilted downward at rotation or inclination angle α, and the camera's distance determination component 408 generates pixel-wise distance data 618 based on a portion of the light reflected from the floor 206 back to the camera's imaging components (e.g., photo-sensor component 406, lens element 608, photo-receiver array 610, etc.). The distance data 618 can be generated as described above in connection with FIG. 6. This distance data 618 comprises an array of distance values $d_{so}$ for respective pixels of the camera's pixel array. In some embodiments, distance determination component 408 may only compute distances $d_{so}$ for a subset of the camera's pixels that correspond to the defined protective field 506. Distance determination component 408 updates the distance values $d_{so}$ substantially in real time during normal operation of the collision avoidance system 402.

Distance determination component 408 also computes the horizontal distance $d_{vo}$ corresponding to each pixel (or each pixel corresponding to the protective field 506) based on these measured values of $d_{so}$. In an example embodiment, distance determination component 408 can compute values of $d_{vo}$ using a trigonometric approach based on the distance values $d_{so}$ as well as the inclination angle α of the camera 424 and the pixel field of view angle β, according to the following equation or a variation thereof:

$$d_{vo} = d_{so} \cos(\alpha + \beta) \qquad (2)$$

That is, distance determination component 408 can determine the horizontal distance $d_{vo}$ for a given pixel—that is, the horizontal distance from the AGV 202 to a point on the obstacle 204 seen by the pixel—based on the pixel's measured distance value $d_{so}$ multiplied by the cosine of the sum of the inclination angle α and the pixel field of view angle β. In some embodiments, the pixel field of view angle β may be a fixed parameter stored on the camera's memory (e.g., memory 422) for each pixel stored on the camera's memory. The inclination angle α may be measured internally by the collision avoidance system 402, or may be a fixed parameter set manually by a user based on camera installation measurements.

Distance determination component 408 can update the calculated distance value $d_{vo}$ for each pixel substantially in real time as the measured distance $d_{so}$ is updated during normal operation. This calculated distance value $d_{vo}$ represents the horizontal distance from the AGV 202 to the point on the obstacle 204 corresponding to the pixel. These calculated values of $d_{vo}$ are provided to the control output component 414, which analyzes the values of $d_{vo}$ to determine whether the obstacle 204 is within the defined minimum safe distance (the protective field's threshold distance $D_P$) from the AGV 202. In response to determining that the obstacle 204 is within the minimum safe distance, the control output component 414 can generate control output 624, thereby initiating a safety action intended to mitigate a collision between obstacle 204 and AGV 202 (e.g., by diverting the path of the AGV 202, slowing or stopping the AGV 202, or triggering a warning indication in the case of human obstacles).

Control output component 414 can apply any suitable analysis to the values of $d_{vo}$ to determine whether to initiate control output 624. For example, in some embodiments control output component 414 may generate the control output 624 if any one of the array of values of $d_{vo}$ (corresponding to respective pixels of the protective field) are less than the defined minimum safe distance. In such embodiments, control output component 414 may generate the control output 624 only if the value of $d_{vo}$ remains less than the minimum safe distance for a duration of time in excess of a defined debounce duration. In other embodiments, control output component 414 may generate the control output 624 in response to determining that a number of pixels in excess of a defined threshold number N have corresponding distance values $d_{vo}$ that are less than the minimum safe distance. This approach may also be associated with a debouce duration in some embodiments, such that control output component 414 generates the control output 624 in response to determining that the total number of pixels having respective values of $d_{vo}$ that are less than the minimum safe distance has exceeded N pixels for a defined duration of time (a debounce duration). This debounce duration can be set to mitigate premature initiation of safety actions in response to momentary or glancing intersections between the protective field 506 and obstacles 204, or in response to momentary loss of distance information for one or more pixels, while still ensuring that safety measures are reliably performed in response to legitimate collision hazards.

Figure 10:
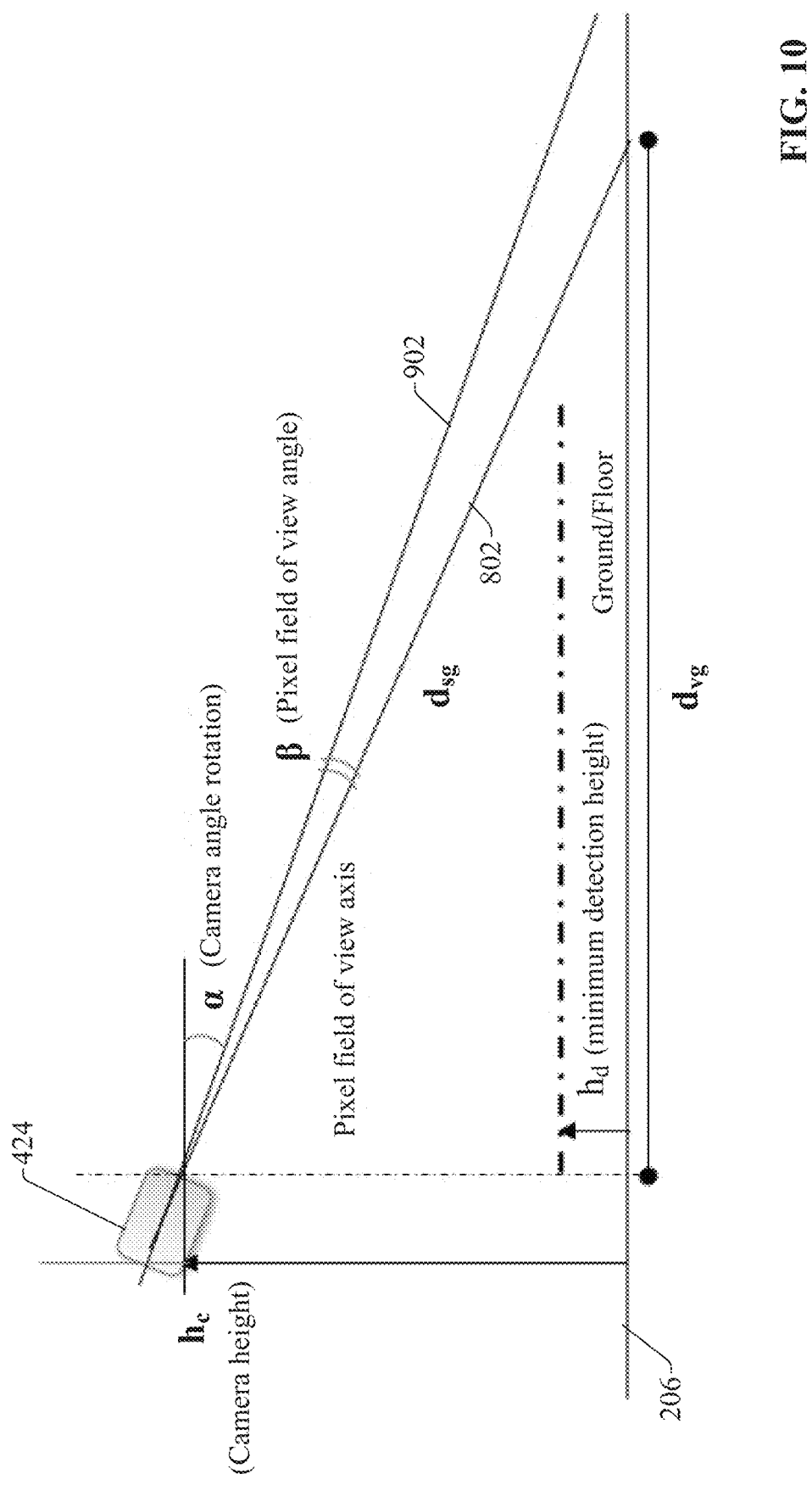
FIG. 10 is a diagram illustrating a diagnostic approach that can be carried out by a diagnostic component to confirm that a collision avoidance system is correctly measuring distances.
Figure 11:
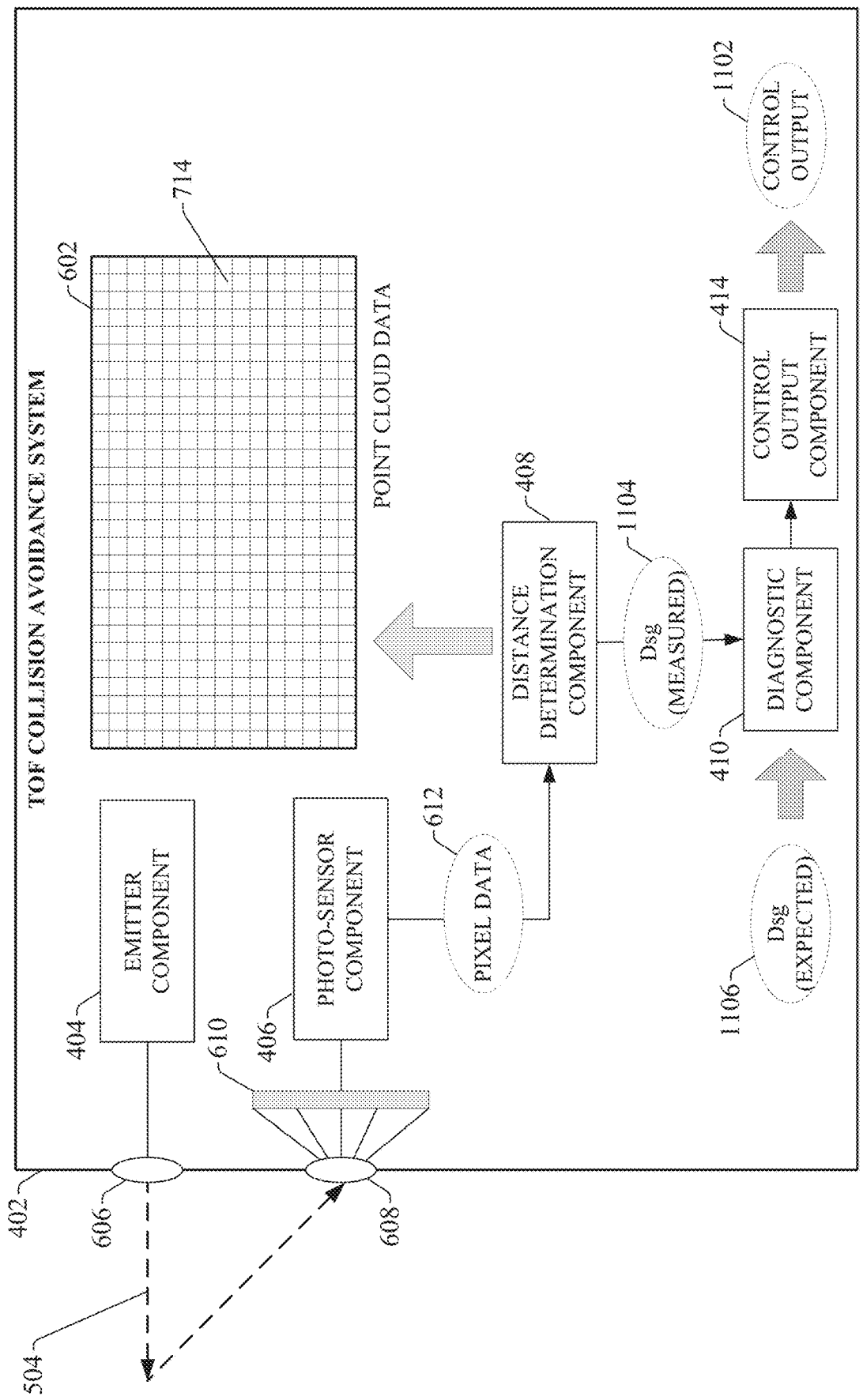
FIG. 11 is a block diagram illustrating example data flows carried out by a collision avoidance system during a diagnostic sequence.

To verify proper operation of the collusion avoidance system's distance measurement components, the diagnostic component 410 of collision avoidance system 402 can initiate a diagnostic sequence at defined intervals (e.g., periodically, or in response to a defined conditions) during normal operation. This diagnostic sequence is intended to verify that all optical and sensing elements in the return light path are properly operating and collaborating to produce accurate distance values $d_{so}$. FIG. 10 is a diagram illustrating a diagnostic approach that can be carried out by diagnostic component 410 to confirm that collision avoidance system 402 is correctly measuring distances. FIG. 11 is a block diagram illustrating example data flows carried out by the collision avoidance system 402 during the diagnostic sequence. Typically, diagnostic component 410 will initiate the diagnostic sequence only if there are no obstacles 204 within the protective field 506 and the 3D TOF camera 424 has an unobstructed view of the floor 206. If an obstacle 204 is within the camera's protective field 506 at the time of a scheduled diagnostic test, the diagnostic component 410 will postpone the diagnostic test until such time as the camera's protective field is free of obstructions.

With reference to FIG. 10, for a given height $h_c$ of the camera above the floor 206 (where height $h_c$ is the vertical distance of the camera 424 from the floor 206), the distance 802 from each pixel to the ground or floor 206 along the optical axis of the pixel a known function of $h_e$. This distance 802 is given as $d_{sg}$ in FIG. 10, and can be derived as a function of the camera height $h_c$ according to the following equation:

$$d_{sg} = \frac{h_c}{\sin(\alpha + \beta)} \quad (3)$$

That is, the distance $d_{sg}$ from a pixel of camera 424 to the floor 206 along the optical axis of the pixel is equal to the vertical height $h_c$ of the camera 424 above the floor 206 divided by the sine of the sum of the camera inclination angle α and the pixel field of view angle β.

Accordingly, collision avoidance system 402 can measure this distance $d_{sg}$ during the diagnostic sequence and compare the measured value of $d_{sg}$ with this expected value of $d_{sg}$ to determine whether the system's optical and imaging components along the return light path are generating correct distance values. In particular, during the diagnostic sequence, emitter component 404 emits a pulsed light beam 504 (e.g., via emitting lens element 606) directed to the floor 206, and photo-sensor component 406 generates pixel data 612 based on analysis of light pulses reflected back to the camera from the floor 206 (as described above in connection with FIG. 6). The pixel data 612 is provided to distance determination component 408, which computes distance values for each pixel 614 of the resulting image based on the pixel data 612 (e.g., based on equation (1) or a variation thereof), resulting in a measured distance value $d_{sg}$ for each pixel 614.

For each pixel, diagnostic component 410 compares that pixel's measured value of $d_{sg}$ 1104 with the pixel's expected value of $d_{sg}$ 1106 (see FIG. 11). Typically, since different pixels of the camera's pixel array will be associated with different pixel field of view angles β, each pixel will have its own expected value of $d_{sg}$ 1106 that is a function of this angle β (given by equation (4)). In some configurations, the expected value of $d_{sg}$ 1106 for a given pixel may depend on the row of the pixel array within which the pixel is located, which determines the pixel's field of view angle β relative to the upper boundary 902 of the camera's total field of view. The expected value of $d_{sg}$ 1106 for each pixel of the array can be stored in memory (e.g., memory 422) associated with the collision avoidance system 402. In some embodiments, diagnostic component 410 can be configured to automatically update the expected values of $d_{sg}$ 1106 in response to detected changes in the camera's height $h_c$ or inclination angle α. In such embodiments, camera 424 may be equipped with a height measurement component that measures its own distance $h_c$ from the floor 206, and/or level sensing components that measure the camera's inclination angle α relative to the horizontal 904. Based on measurements from these components, diagnostic component 410 can maintain accurate estimates of the expected distances $d_{sg}$ 1106 that each pixel should be reporting during the diagnostic sequence.

Diagnostic component 410 can perform distance measurement validation for each pixel 614 in the pixel array during the diagnostic sequence. If the measured values of $d_{sg}$ 1104 for a number of pixels deviate from their corresponding respective values in excess of a defined tolerance, diagnostic component 410 can notify control output component 414 that reliability of the collision avoidance system's distance measurements has fallen below an acceptable level, causing control output component 414 to issue a control output 1102 that places the AGV 202 in a safe state (e.g., by stopping the AGV or otherwise placing the AGV in a state in which faulty distance measurements will not result in harm or damage). The AGV 202 can then be decommissioned until the distance measurement faults are corrected (e.g., by replacing the camera 424 or the entire collision avoidance system 402, or by otherwise correcting the fault in the camera's distance measurement components). Alternatively, if diagnostic component 410 determines that the measured distance values $d_{sg}$ 1104 align with their corresponding expected values 1106, normal operation of the AGV and its collision avoidance system 402 is permitted to continue.

Diagnostic component 410 can use substantially any criteria for determining when the camera's distance measurement reliability has fallen below acceptable levels and necessitates placement of the AGV 202 in a safe state. For example, diagnostic component 410 may initiate control output 1102 in response to determining that a number of pixels above a defined threshold number report measured values of $d_{sg}$ 1104 that deviate from their corresponding expected values 1106 in excess of a defined tolerance. Such configurations may mitigate unnecessary decommissioning of the AGV 202 when only a small number of pixels have become unreliable, since the number of functioning pixels may remain sufficiently large in such scenarios to ensure a high level of safety reliability.

Figure 12:
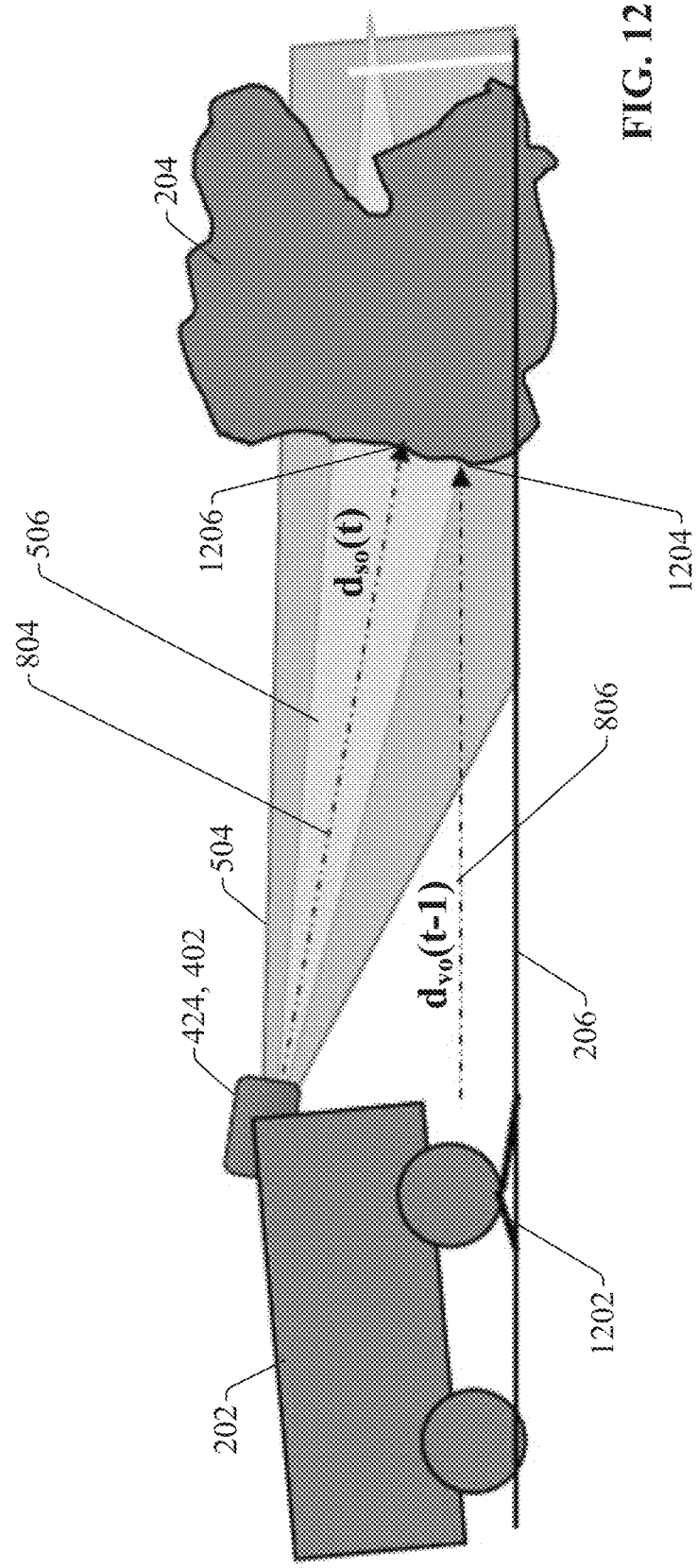
FIG. 12 is a diagram illustrating a scenario in which an AGV is moving over a bump in the floor.

If the ground or floor 206 is relatively flat over all areas on which the AVG 202 will traverse, measured test distance values $d_{sg}$ from the camera 424 to the floor will remain somewhat consistent regardless of the AGV's location, and measured distances $d_{so}$ from the camera 424 to obstacles 204 (as well as corresponding calculated values $d_{vo}$ from the AGV to the obstacle 204 based on the measured distances $d_{so}$) will be accurate as the AVG 202 moves around the area, barring faults in the system's distance measuring components. If the floor 206 is uneven—that is, the floor 206 changes in inclination at different areas—the test distance value $d_{sg}$ returned by a pixel may be inconsistent as the AGV 202 moves over this variable terrain. FIG. 12 is a diagram illustrating a scenario in which AGV 202 is moving over a bump 1202 in the floor 206. In this example, the front wheels of the AGV 202 have been elevated by the bump 1202, causing the AGV 202 and its associated camera 424 to change inclination. At the moment prior to the AGV's contact with the bump 1202 (at time (t−1)), the calculated distance 806 from the AGV 202 to the obstacle 204 (based on measured distance 804 from the camera 424 to the obstacle 204) for a given pixel was based on the distance $d_{so}$ measured to point 1204 on the obstacle 204 (that is, the point 1204 seen by the pixel). When the AGV 202 is elevated by bump 1202 (at time t), the pixel's field of view is also elevated such that distance $d_{so}$ is measured to point 1206, which is considerably higher than the point that would be used as the basis for measured distance $d_{so}$ (and calculated distance $d_{vo}$) if the AVG 202 remained on flat terrain. This measurement discontinuity as the AGV 202 is traversing uneven terrain can cause the calculated distance $d_{vo}$ to be inconsistent as the AGV 202 and obstacle 204 approach one another.

In general, the inclination of the AGV 202 and camera 424 will vary at each bump 1202 relative to the average slope of the floor 206. This causes the central axis of the camera 424 to move relative to the floor 206 and relative to obstacles 204 located on the floor 206. This variation in inclination can render measurements of distance 806 from the AGV 202 to obstacles in the AGV's path inaccurate.

Figure 13:
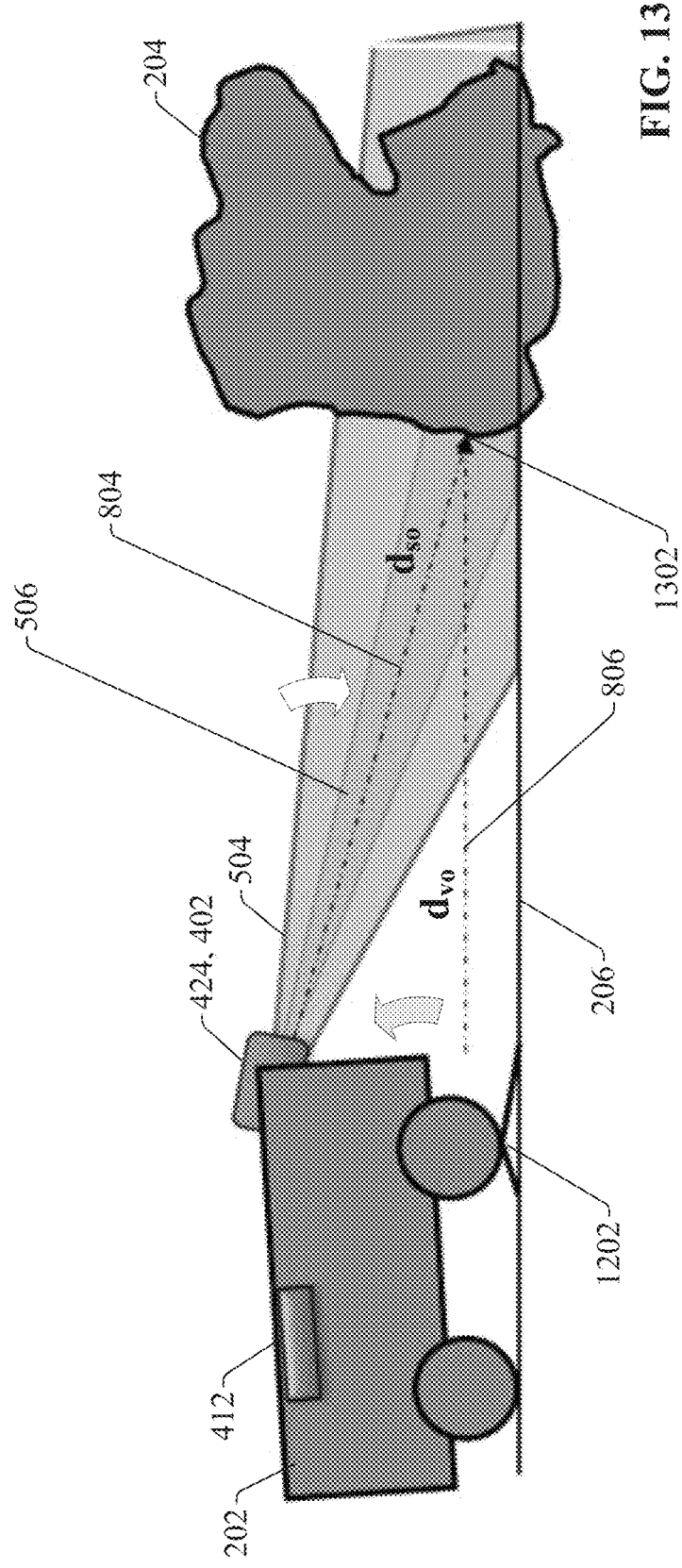
FIG. 13 is a diagram illustrating an example AGV that includes a collision avoidance system with an associated level component used to compensate for variations of inclination.

To address this issue, the collision avoidance system 402 can include level component 412 capable of measuring an inclination of the AGV 202 and correcting distance measurements based on this measured inclination. FIG. 13 is a diagram illustrating an example AGV 202 that includes a collision avoidance system 402 with an associated level component 412 used to compensate for variations of inclination. In this example, level component 412 is configured to measure and quantify a degree of inclination of the AGV 202 relative to the horizontal, or to otherwise measure and quantify a direction and degree of a change in the AGV's inclination relative to an average slope of the ground or floor 206. Based on the measured degree of inclination, camera 424 automatically adjusts the protective field 506 to compensate for the measured inclination. In the example depicted in FIG. 13, the AGV 202 is inclined upward due to rolling over bump 1202. Level component 412 measures the direction and magnitude of this change in the AVG's inclination or tilt, and camera 424 adjusts the protective field 506 downward by an amount calculated to compensate for the degree of inclination measured by the level component 412. In particular, the protective field 506 is adjusted such that the protective field 506 intersects with a section of the obstacle 204 that would be covered by the protective field 506 if the AGV 202 was on level ground (or had an inclination that matched the average slope of the floor 206), thus ensuring reasonable measurement continuity from the moment just prior to contact with the bump 1202.

Figure 14:
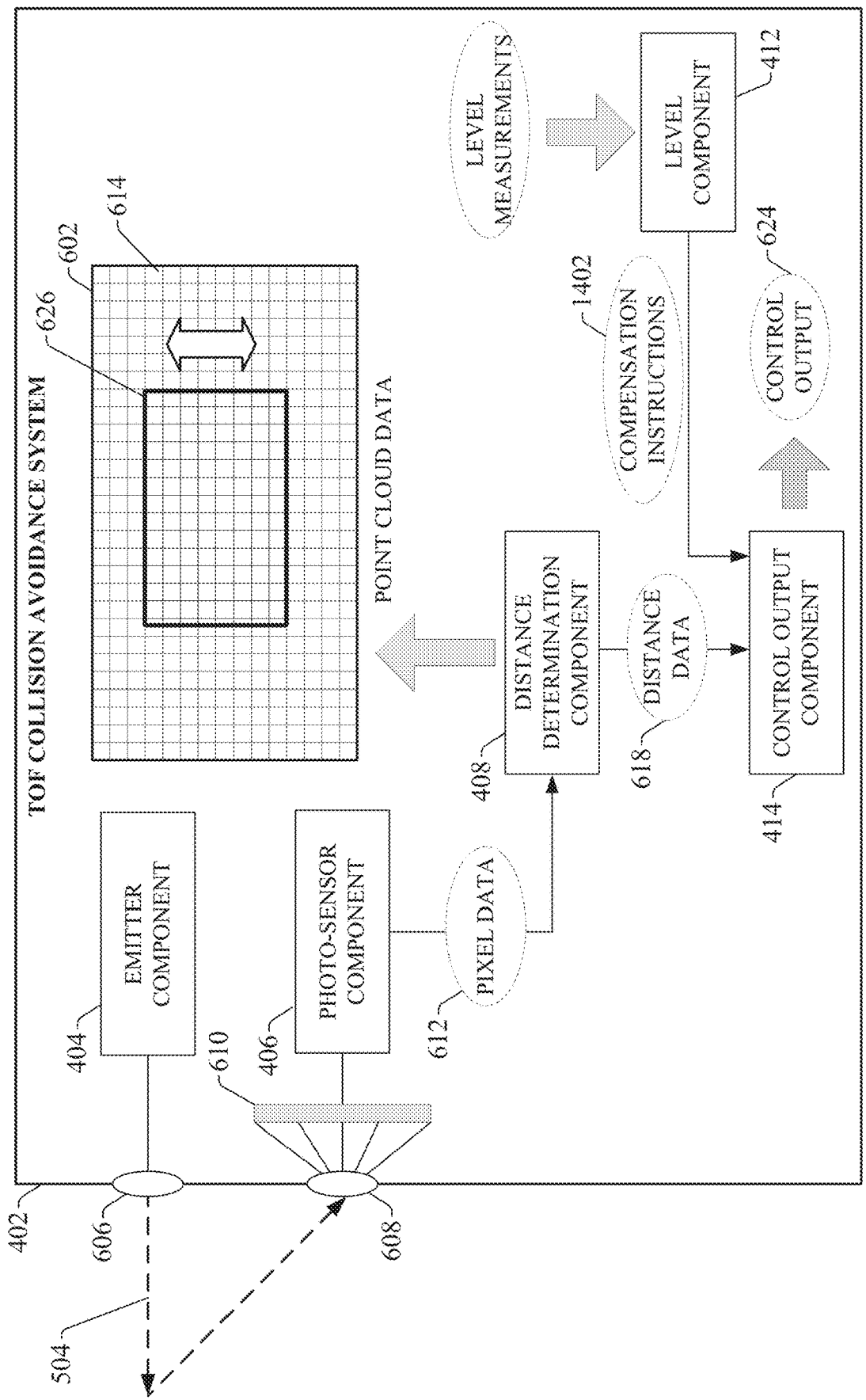
FIG. 14 is a block diagram illustrating components of a TOF collision avoidance system including a level component.

FIG. 14 is a block diagram illustrating components of TOF collision avoidance system 402 including a level component 412 according to one or more embodiments. As described above, level component 412 measures the direction and degree of inclination of the AGV 202 (or the collision avoidance system 402 itself) and generates compensation instructions 1402 directed to the control output component 414 for adjusting the protective field 506 to be monitored for intrusions. This adjustment can comprise, for example, shifting the defined section 626 of point cloud 602—which represents the x-y boundaries of the protective field 506—upward or downward within the boundaries of the point cloud 602 to maintain measurement continuity relative to the obstacle 204

Although FIG. 14 depicts protective field adjustment as being performed by control output component 414 (e.g., by shifting the section 626 of the image being monitored for intrusions to compensate for detected inclinations) other approaches for adjusting the protective field 506 are also within the scope of one or more embodiments. Inclination compensation can also be performed mechanically in some embodiments. For example, in some embodiments camera 424 can be installed in a gimbal stabilizer mounted to the front of AGV 202, thereby maintaining a substantially consistent downward tilt of camera 424 regardless of the inclination of the AGV 202.

Figure 15:
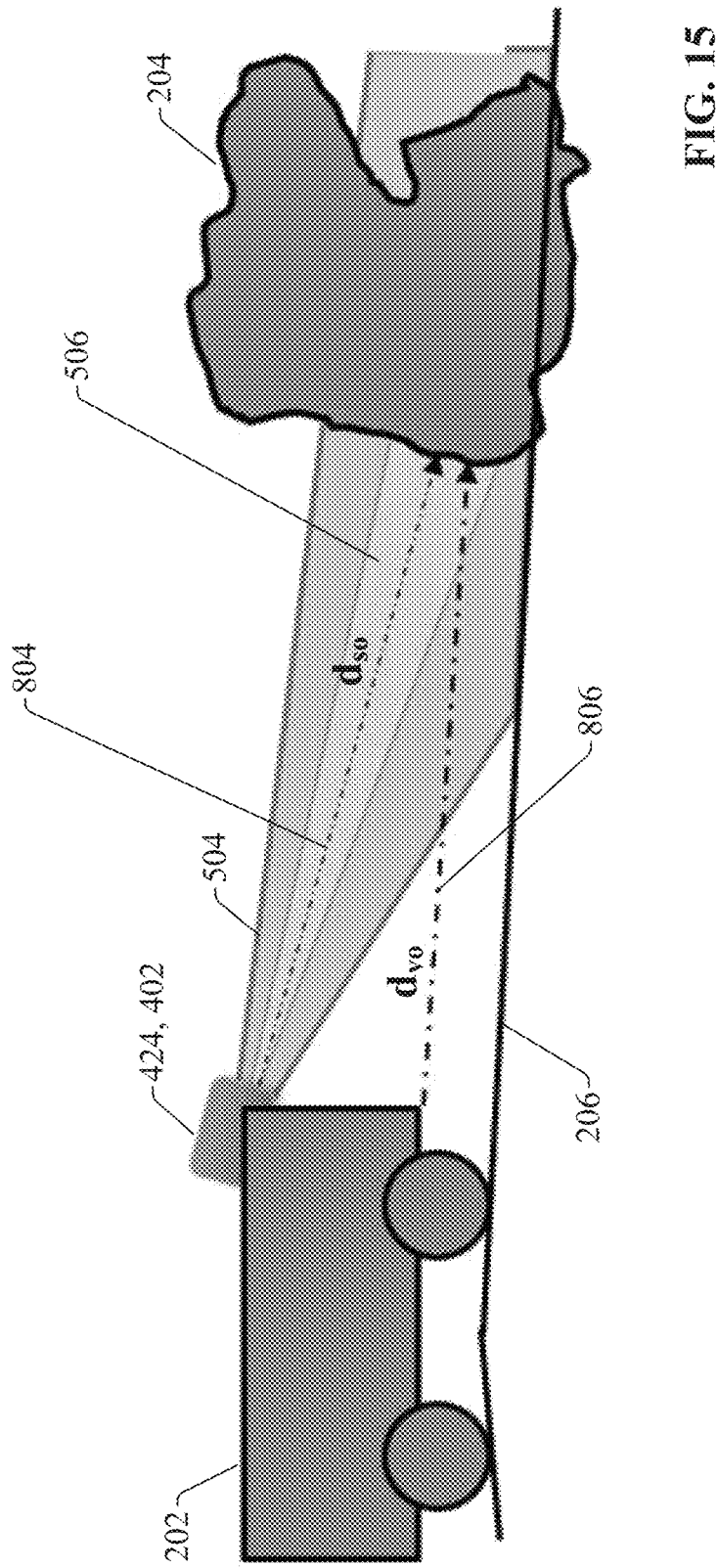
FIG. 15 is a diagram illustrating a scenario in which an AGV is traversing a downwardly sloping floor.

The approaches for compensating for variations in the AGV's degree of incline can also ensure stable and consistent distance measurements $d_{vo}$ in scenarios in which the average slope of the ground or floor 206 is not horizontal. FIG. 15 is a diagram illustrating a scenario in which AGV 202 is traversing a downwardly sloping floor 206. In this scenario, it is assumed that floor 206 has an uneven surface comprising various bumps or depressions, with an average slope conforming to the downward incline depicted in FIG. 15. When AGV 202 begins traversing the downward incline, level component 412 will measure this change in inclination and adjust the protective field 506 accordingly, as discussed above. Thereafter, while the AVG 202 continues to traverse this downward incline, the level component 412 will hold this position of the protective field 506 relative to the average slope of the floor 206, compensating for bumps and depressions encountered by the AGV 202 during its descent down the incline.

Although the examples described above in connection with FIGS. 12-15 consider scenarios in which the AVG 202 tilts in one axis (namely, the front and rear of the AVG 202 moving up or down due to irregularities in the terrain), this approach for compensating for variations in the AGV's incline can also be extended to scenarios in which the AVG 202 tilts left or right as well.

Embodiments described herein can improve the safety reliability of collision avoidance systems by using a multi-pixel 3D TOF camera to monitor a larger volume in front of a mobile asset relative to a 2D scanner. By tilting the TOF camera such that the field of view monitors a volume that incudes the ground as well as any obstacles in front of the mobile asset, diagnostic features can be integrated into the collision avoidance system that leverage return light from the ground to confirm reliability and accuracy of the system's distance measurement components (including optical and imaging components), thereby further improving the safety rating of the system. The system's object detection reliability can be further improved by automatically adjusting the monitored protective field to compensate for uneven ground.

FIGS. 16-18B illustrate methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 16:
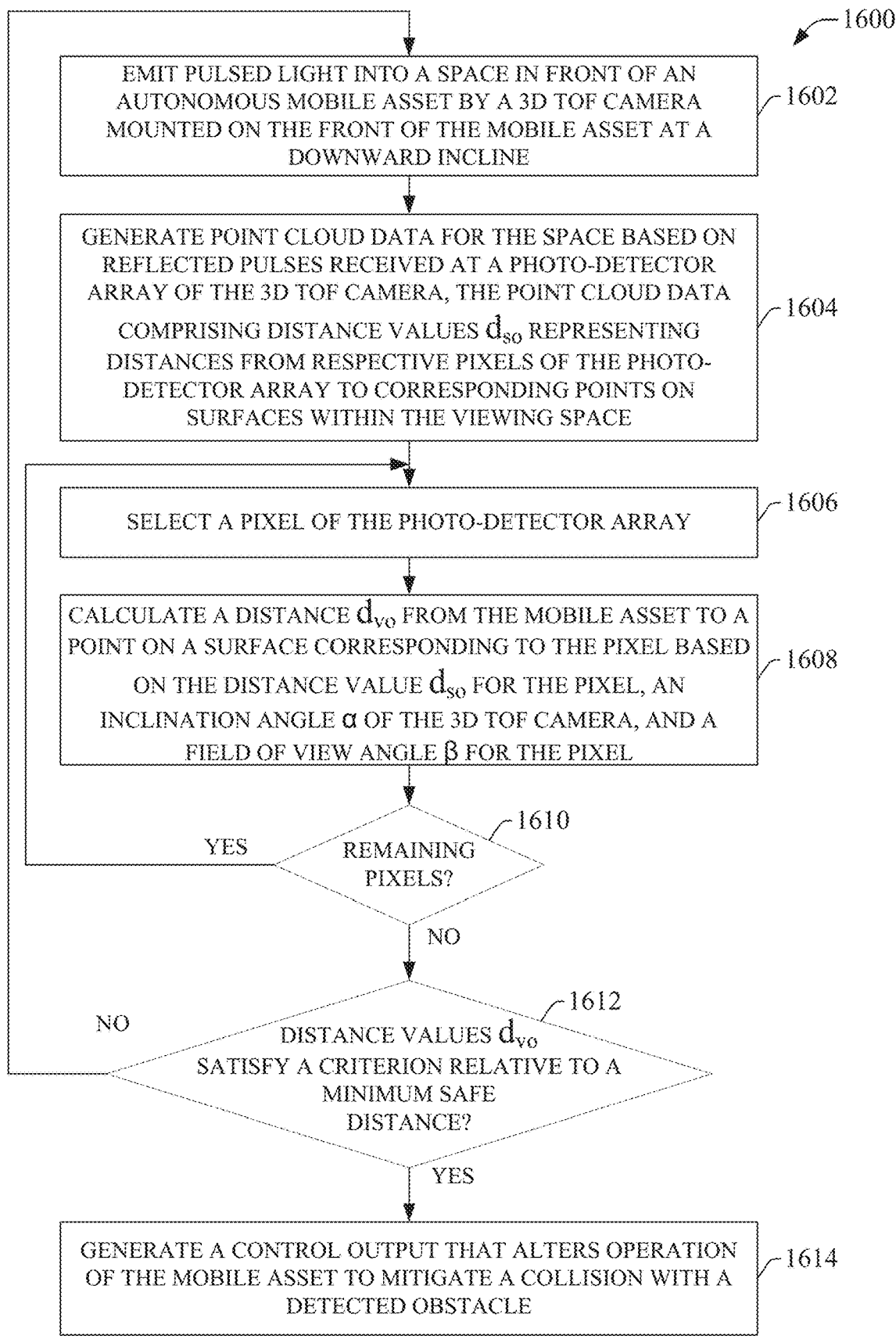
FIG. 16 is a flowchart of an example methodology for avoiding collisions between an autonomous mobile asset.

FIG. 16 illustrates an example methodology 1600 for avoiding collisions between an autonomous mobile asset (e.g., an AGV, an AMR, or another type of guided or intelligently mobile vehicle or machine). Initially, at 1602, pulsed light is emitted into a space in front of an autonomous or guided mobile asset by a 3D TOF camera mounted on the front of the mobile asset at a downward incline. The TOF camera is inclined downward such that a portion of the floor is include in the protective field of the TOF camera and reflects a portion of light emitted by the camera back to the camera's photo-detector. At 1604, point cloud data is generated for the viewing space based on reflected pulses received at a photo-detector array of the TOF camera. The point cloud data comprises distance values $d_{so}$ representing distances from respective pixels of the photo-detector array to corresponding points on surfaces within the viewing space.

At 1606, a pixel of the photo-detector array is selected. At 1608, a distance $d_{vo}$ is calculated for the pixel. Distance $d_{vo}$ represents a horizontal distance from the mobile asset to a point on a surface corresponding to the pixel (that is, a point within the pixel's field of view), or a distance from the mobile asset to the point along a line substantially parallel with a slope of the ground or floor on which the mobile asset is moving. Distance $d_{vo}$ can be calculated based on the measured distance $d_{so}$ generated at step 1604, the inclination angle α of the TOF camera (that is, the angle of the camera's downward inclination relative to horizontal), and a field of view angle β for the pixel. In some embodiments, equation (2) above, or a variation thereof, can be used to calculate distance $d_{vo}$ based on these factors. Any suitable technique can be used to determine the inclination angle α of the TOF camera and the field of view angle β for the pixel. For example, the inclination angle α may be measured dynamically using a level component within the camera itself, which reports its inclination angle to the system. Alternatively, inclination angle α may be set manually based on an as-installed angle of tilt measured by an engineer and entered into the system. The field of view angle β for the pixel may be a fixed parameter of the pixel stored in memory and referenced by the system to calculate distance $d_{vo}$.

At 1610, a determination is made as to whether remaining pixels require calculation of an associated distance $d_{vo}$. In some embodiments, values of distance $d_{vo}$ may be calculated for all pixels of photo-detector's pixel array. In other embodiments, the system may only calculate values of distance $d_{vo}$ for a subset of pixels corresponding to the defined protective field. If additional pixels require calculation of distance $d_{vo}$ (YES at step 1610) the methodology returns to step 1606, where another pixel is selected, and distance $d_{vo}$ is calculated for the newly selected pixel at step 1608. Alternatively, if values of distance $d_{vo}$ have been calculated for all necessary pixels (NO at step 1610), the methodology proceeds to step 1612.

At 1612, a determination is made as to whether the distance values $d_{vo}$ calculated by iterations of steps 1606-1610 satisfy a criterion relative to a defined minimum safe distance of the protective field. In general, the criterion defines a condition indicative of intrusion of an obstacle within the protective field monitored by the camera, which requires initiation of a collision avoidance action. In some embodiments, the criterion may define a maximum number of pixels whose corresponding distance value $d_{vo}$ are permitted to be less than the defined minimum safe distance from the mobile asset. Other criteria indicative of an intrusion of an obstacle are also within the scope of one or more embodiments.

If the distance values $d_{vo}$ do not satisfy the criterion (NO at step 1612), the methodology returns to step 1602 and steps 1602-1610 repeat. Alternatively, if the distance values $d_{vo}$ satisfy the criterion (YES at step 1612), the methodology proceeds to step 1614, where a control output is generated that alters operation of the mobile asset in a manner intended to mitigate a collision with the detected obstacle. In various embodiments, the control output may alter the current trajectory of the mobile asset, slow the mobile asset, or stop the mobile asset. The control output may also initiate an audible or visual warning of a possible collision.

Figure 17A:
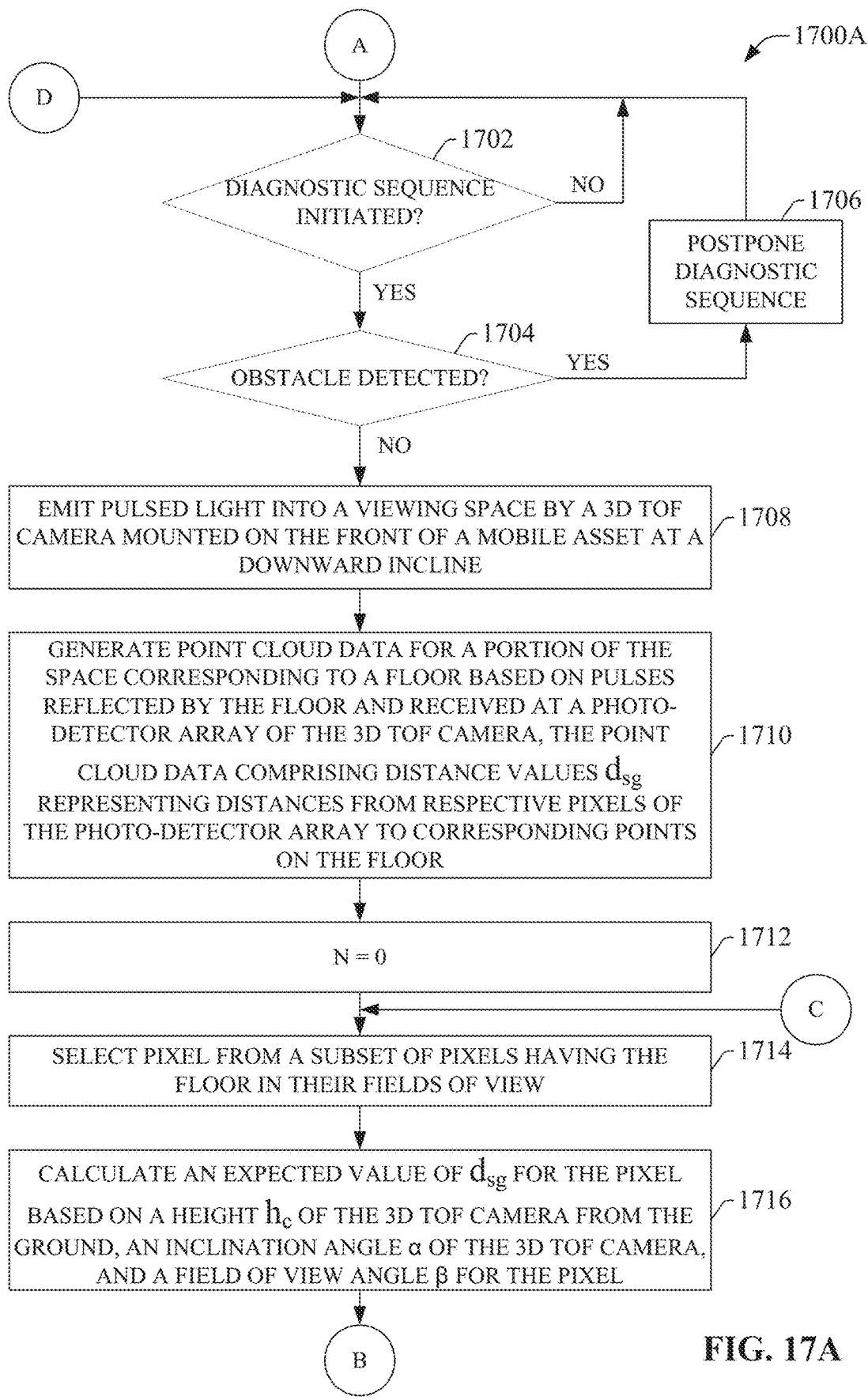
FIG. 17A is a flowchart of a first part of an example methodology for verifying that a 3D TOF camera that is part of a collision avoidance system is generating accurate distance measurements.

FIG. 17A illustrates a first part of an example methodology 1700A for verifying that a 3D TOF camera that is part of a collision avoidance system is generating accurate distance measurements. The 3D TOF camera is mounted to the front of an autonomous or guided mobile asset at a downward inclination such that a portion of the light emitted by the camera is reflected back to the camera by the floor. Initially, at 1702, a determination is made as to whether a diagnostic sequence is initiated. In some embodiments, the collision avoidance system can be configured to initiate the diagnostic sequence at regular or semi-regular intervals (e.g., once an hour, once a day, etc.). In other embodiments, the system may initiate the diagnostic sequence in response to detected conditions indicative of a possible loss of distance measurement accuracy.

If a diagnostic sequence is initiated (YES at step 1702), the methodology proceeds to step 1704, where a determination is made as to whether an obstacle is detected in the TOF camera's field of view (e.g., based on the current measured distance values measured by the camera's pixel array). In general, the diagnostic sequence should be run only if no obstacles are currently within the camera's protective field. If an obstacle is detected (YES at step 1704), the diagnostic sequence is postponed (step 1706). When the diagnostic sequence is initiated and no obstacles are detected within the camera's field of view (NO at step 1704), the methodology proceeds to step 1708, where pulsed light is emitted into a space in front of the mobile asset. Since the camera is tilted downward, a portion of the emitted light is reflected back to the camera's photo-detector by the floor.

At 1710, point cloud data is generated for a portion of the space corresponding to the floor based on pulses reflected by the floor and received at the photo-detector array of the TOF camera. The point cloud data comprises distance values $d_{sg}$ representing distances from respective pixels of the photo-detector array to corresponding points on the floor (that is, points within the fields of view of the respective pixels).

At 1712, a variable N is set to zero. At 1714, a pixel of the camera's pixel array is selected from among the subset of pixels having the floor within their fields of view. At 1716, an expected distance $d_{sg}$ for the pixel selected at step 1714 is calculated based on a height $h_c$ of the TOF camera from the ground, an inclination angle $\alpha$ of the camera, and a field of view angle $\beta$ for the pixel. The inclination angle $\alpha$ and field of view angle $\beta$ can be determined as described above in connection with step 1608 of methodology 1600. In some embodiments, the height $h_c$ of the camera can be measured by height measurement components within the camera itself, which report the distance of the camera from the floor. In other embodiments, the height $h_c$ may be entered by an engineer as a fixed parameter based on as-installed measurements. In an example calculation approach, the expected value of distance $d_{sg}$ can be obtained using equation (3) or a variation thereof.

Figure 17B:
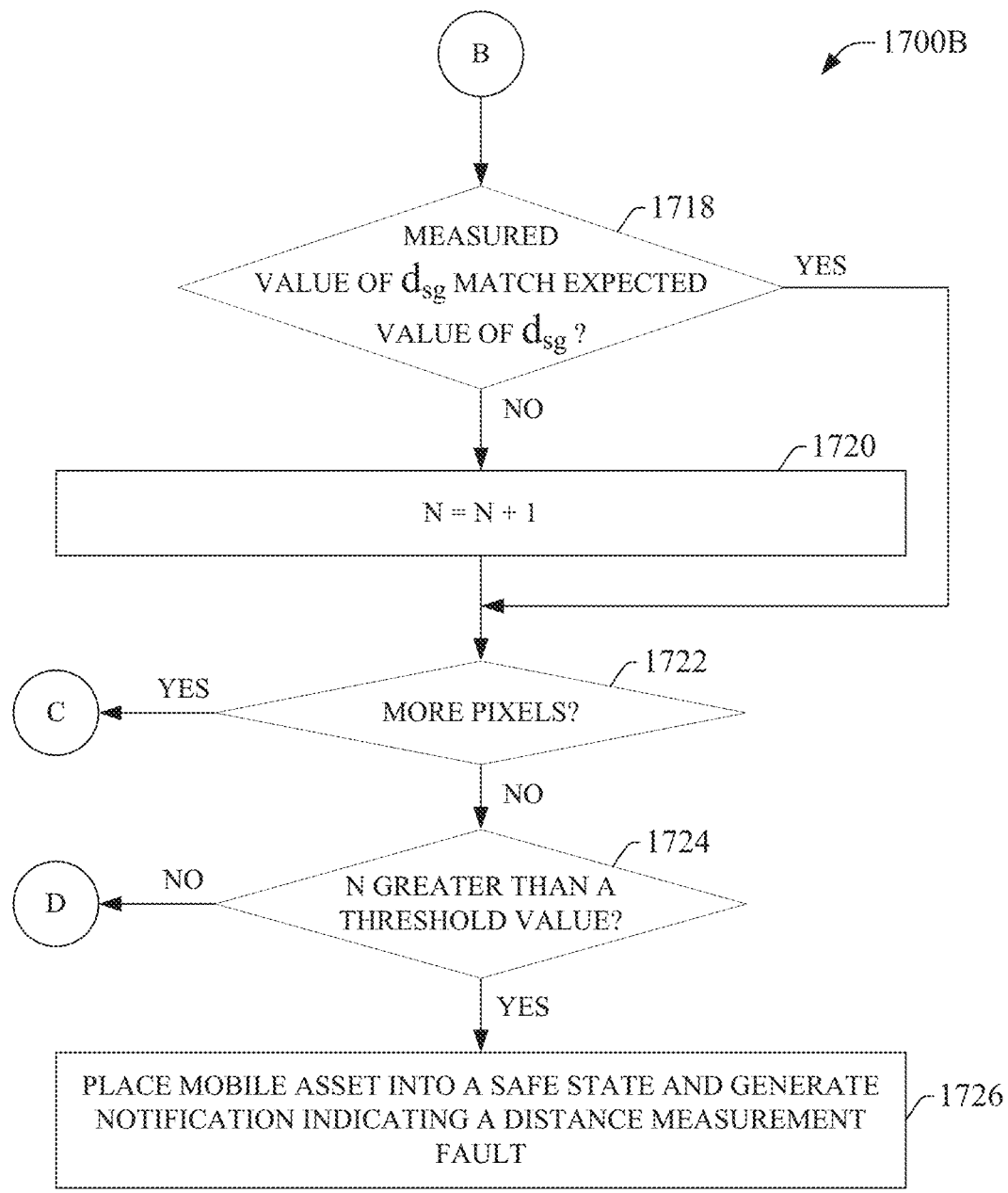
FIG. 17B is a flowchart of a second part of the example methodology for verifying that a 3D TOF camera that is part of a collision avoidance system is generating accurate distance measurements.

The methodology then proceeds to the second part 1700B illustrated in FIG. 17B. At 1718, a determination is made as to whether the measured value of $d_{sg}$ obtained at step 1710 matches the expected value of $d_{sg}$ calculated at step 1716 within a defined tolerance. If the measured value of $d_{sg}$ does not match the expected value of $d_{sg}$ within the defined tolerance (NO at step 1718), the methodology proceeds to step 1720, where the variable N is incremented. Variable N counts the number of pixels whose distance values $d_{sg}$ do not match their expected values. The methodology then proceeds to step 1722. If, at step 1718, it is determined that the measured value of $d_{sg}$ matches its expected value (YES at step 1718), the methodology proceeds to step 1722 without incrementing N at step 1720.

At 1722, a determination is made as to whether more pixels are to be assessed. In some embodiments, the system may diagnose all pixels of the array having the floor within their field of view. In other embodiments, a smaller representative sample of pixels may be assessed. If more pixels are to be diagnosed (YES at step 1722), the methodology returns to step 1714, where another pixel is selected, and steps 1716-1722 are repeated for the newly selected pixel. When all pixels to be diagnosed have been assessed (NO at step 1722), the methodology proceeds to step 1724, where a determination is made as to whether the value of variable N is greater than a defined threshold indicative of an overall distance measurement fault. If the value of N is not greater than the threshold value (NO at step 1724), the camera has passed the diagnosis and the methodology returns to step 1792 to await the next diagnostic sequence. Alternatively, if the value of N is greater than the threshold value (YES at step 1724), it is determined that the camera's distance measurement components are faulty and the methodology proceeds to step 1726, where the mobile asset is placed into a safe state. A notification indicating a distance measurement fault may also be generated.

Figure 18A:
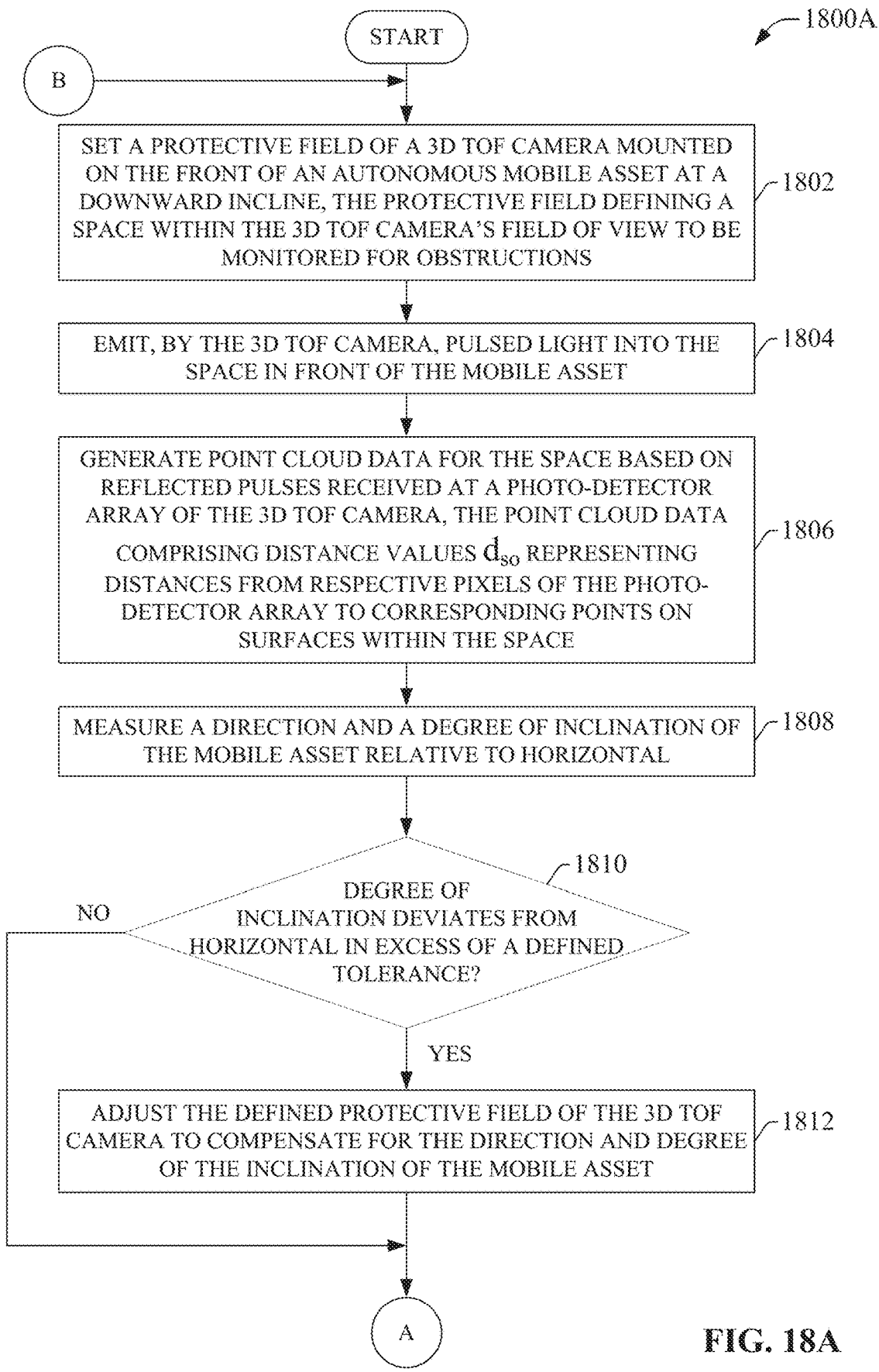
FIG. 18A is a flowchart of a first part of an example methodology for avoiding collisions using a collision avoidance system that adjusts its protective field to compensate for changes in inclination of an associated mobile asset.
Figure 18B:
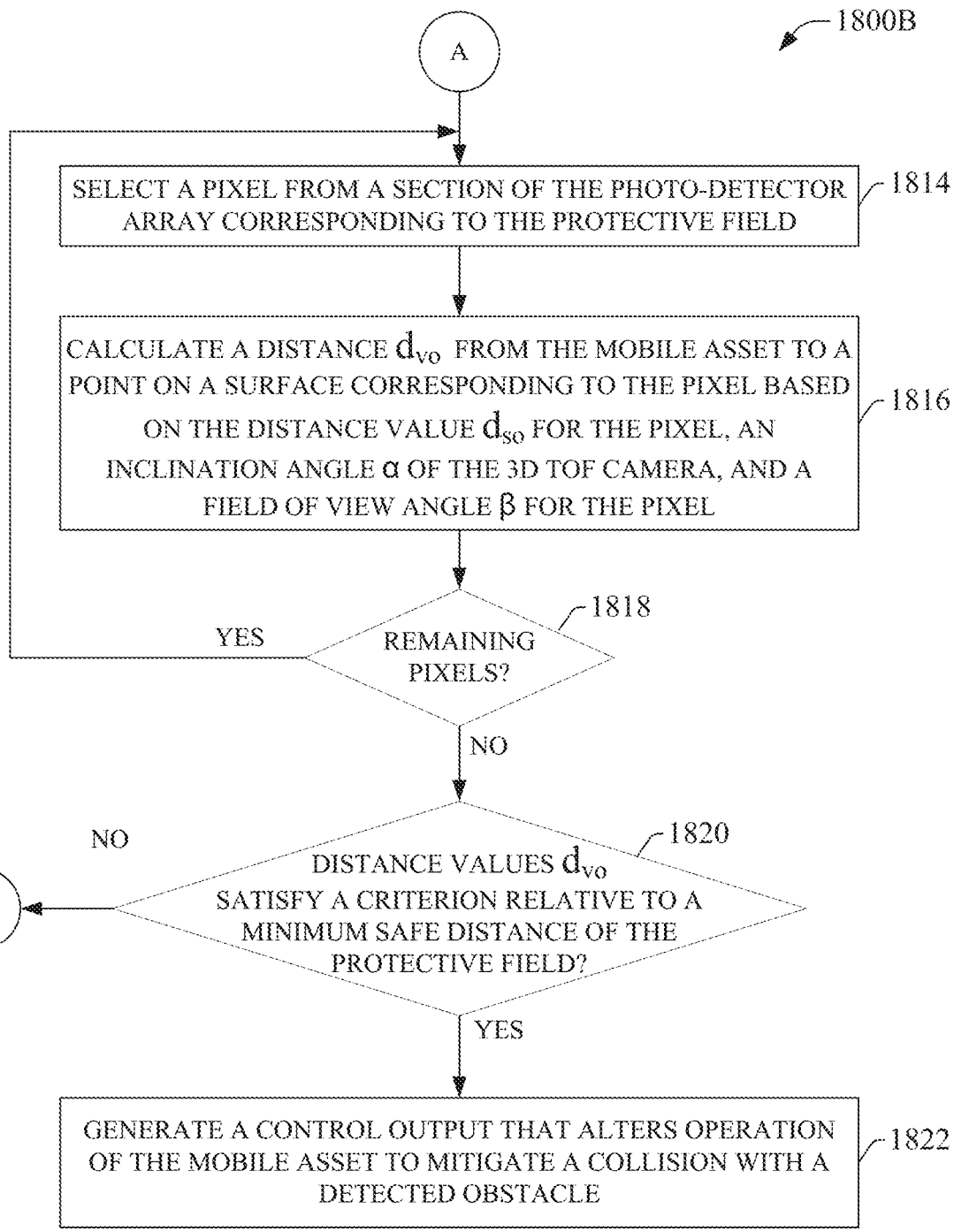
FIG. 18B is a flowchart of a second part of an example methodology for avoiding collisions using a collision avoidance system that adjusts its protective field to compensate for changes in inclination of an associated mobile asset.

FIG. 18A illustrates a first part of an example methodology 1800A for avoiding collisions using a collision avoidance system that adjusts its protective field to compensate for changes in inclination of an associated mobile asset. Initially, at 1802, a protective field is set for a 3D TOF camera mounted on the front of an autonomous or guided mobile asset at a downward inclination. The TOF camera is inclined downward such that a portion of the floor is included in the protective field of the TOF camera and reflects a portion of light emitted by the camera back to the camera's photo-detector for diagnostic purposes, as discussed above in connection with the methodology illustrated in FIGS. 17A-17B. The protective field defines a space within the camera's field of view to be monitored for obstructions, such that detection of an obstruction within the protective field causes the mobile asset to perform a collision avoidance action. In an example embodiment, the x-y boundaries of the protective field can be defined as a section of the camera's total pixel array to be monitored for intrusions, and the z-direction boundary can be defined as one or more minimum safe distances associated with the subset of pixels that make up the selected section of the pixel array.

At 1804, pulsed light is emitted into the space in front of the mobile asset by the 3D TOF camera. At 1806, point cloud data is generated for the space in front of the asset based on reflected pulses received at the camera's photo-detector array. The point cloud data comprises distance values $d_{so}$ representing distances from respective pixels of the photo-detector array to corresponding points on surfaces within the space.

At 1808, a direction and a degree of inclination of the mobile asset relative to horizontal is measured. This measurement can be performed, for example, by a level sensor mounted on or within the asset as part of the collision avoidance system. At 1810, a determination is made as to whether the degree of inclination deviates from horizontal in excess of a defined tolerance. If the degree of inclination deviates from horizontal in excess of the tolerance (YES at step 1810), the methodology proceeds to step 1812, where the protective field defined at step 1802 is adjusted to compensate for the direction and degree of the inclination measured at step 1808. For example, if the asset is inclined upward, the protective field can be adjusted downward to ensure continuity of distance measurements on points within the space in front of the asset. The methodology then proceeds to the second part 1800B illustrated in FIG. 18B. If the degree of inclination does not deviate from horizontal in excess of the tolerance (NO at step 1810), the methodology proceeds direction to the second part 1800B without performing a protective field adjustment (skipping step 1812).

At 1814, a pixel is selected from a section of the photodetector array corresponding to the protective field. At 1816, a distance $d_{vo}$ is calculated based on the pixel's measured distance value $d_{so}$ obtained at step 1806 as well as an inclination angle α of the camera and a field of view angle β for the pixel. Angles α and 13 can be determined as described above in connection with step 1608 of methodology 1600. Distance $d_{vo}$ represents the distance from the mobile asset to a point on a surface corresponding to the pixel (that is, a point within the pixel's field of view).

At 1818, a determination is made as to whether remaining pixels require calculated values of $d_{vo}$. In one or more embodiments, steps 1814 and 1816 can be iterated for each pixel corresponding to the protective field. In other embodiments, steps 1814 and 1816 can be iterated for all pixels of the array, but only those corresponding to the protective field will be evaluated for intrusions in subsequent steps. If remaining pixels require distance calculations (YES at step 1818), the methodology returns to step 1814, where another pixel is selected, and a distance value $d_{vo}$ is calculated for the newly selected pixel.

When distance values $d_{vo}$ have been calculated for all necessary pixels (NO at step 1818), the methodology proceeds to step 1820, where a determination is made as to whether the distance values $d_{vo}$ satisfy a defined criterion relative to the minimum safe distance of the protective field (similar to step 1612 of methodology 1600). The criterion defines a condition indicative of intrusion of an obstacle within the protective field, which requires initiation of a collision avoidance action. If the distance values $d_{vo}$, satisfy the criterion (YES at step 1820), the methodology proceeds to step 1822, where a control output is generated that alters operation of the mobile asset to mitigate a collision with a detected obstacle (similar to step 1614 of methodology 1600). Alternatively, if the distance values $d_{vo}$ do not satisfy the criterion (NO at step 1820), the methodology returns to step 1802 and the methodology repeats.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
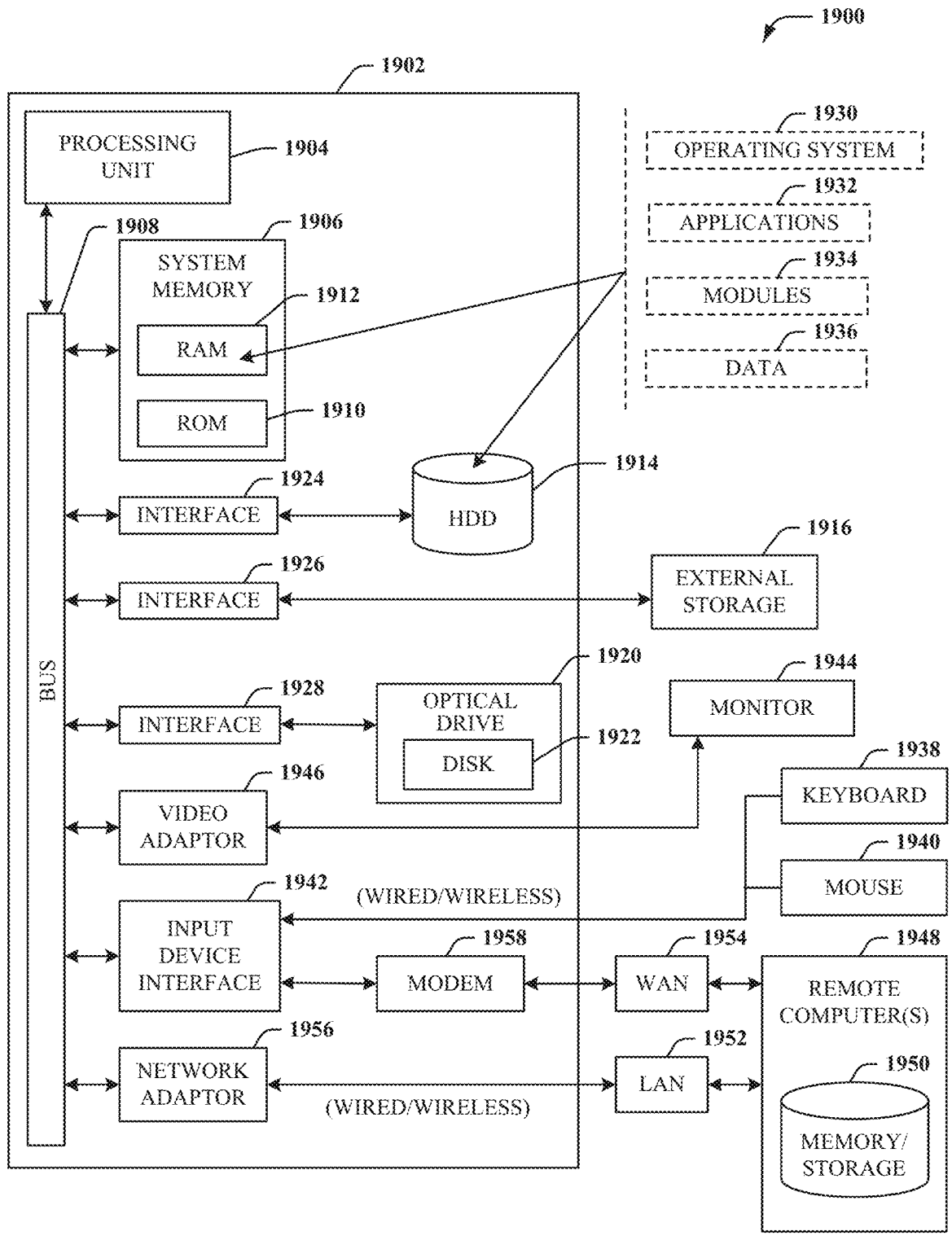
FIG. 19 is an example computing environment.
Figure 20:
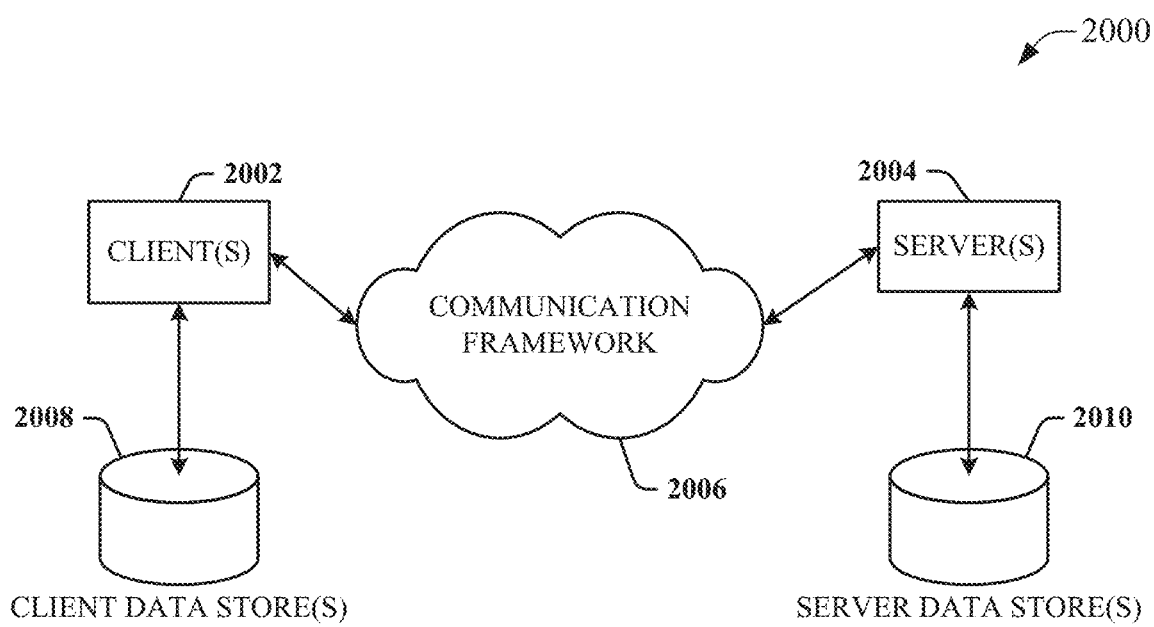
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for application programs 1932. Runtime environments are consistent execution environments that allow application programs 1932 to run on any operating system that includes the runtime environment. Similarly, operating system 1930 can support containers, and application programs 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A collision avoidance system, comprising:
   a three-dimensional camera configured to mount on a front side of a mobile asset at a downward incline that causes a portion of a ground or floor in front of the mobile asset to be included in a field of view of the three-dimensional camera, the three-dimensional camera comprising:
      an emitter component configured to emit light pulses into a space in front of the mobile asset;
      a photo-sensor component comprising an array of pixels, wherein respective pixels of the array of pixels are configured to convert a subset of the light pulses received from surfaces within the space to electrical energy proportional to the subset of the light pulses received at the pixels; and
      a distance determination component configured to:
         determine, based on analysis of the electrical energy, measured distance values $d_{so}$ representing first distances from the respective pixels to corresponding points within the space in front of the mobile asset along optical axes of the pixels, and
         determine calculated distance values $d_{vo}$ representing second distances from the points within the space to the mobile asset along lines substantially parallel to a slope of the ground or floor based on the measured distance values $d_{so}$, field of view angles $\beta$ of the respective pixels representing angles between the respective pixels' optical axes and an upper boundary of the field of view of the three-dimensional camera, and an inclination angle $\alpha$ of the three-dimensional camera relative to horizontal; and
   a control output component configured to generate a control output in response to a determination that at least a subset of the calculated distance values $d_{vo}$ satisfy a defined criterion indicative of a presence of an obstacle within a protective field of the three-dimensional camera, wherein the control output is configured to initiate a safety action that alters operation of the mobile asset to mitigate a collision with the obstacle.

2. The collision avoidance system of claim 1, wherein the mobile asset is at least one of an automated guided vehicle (AGV), an autonomous mobile robot (AMR), a mobile industrial machine, an automated warehouse, an automated car, an automated amusement park ride, or a non-autonomous vehicle.

3. The collision avoidance system of claim 1, wherein the defined criterion specifies that the control output is to be generated if a number of pixels having associated calculated distance values $d_{vo}$ that are less than a minimum safe distance exceeds a defined threshold number of pixels.

4. The collision avoidance system of claim 1, wherein the distance determination component determines the calculated distance value $d_{vo}$ for a pixel, of the pixels, based on a product of the measured distance value $d_{so}$ for the pixel and a cosine of a sum of the field of view angle $\beta$ for the pixel and the inclination angle $\alpha$.

5. The collision avoidance system of claim 1, wherein
   the control output component is configured to generate the control output further in response to determining that at least the subset of the calculated distance values $d_{vo}$ that satisfy the defined criterion are associated with pixels that are within a section of the array of pixels corresponding to the protective field of the three-dimensional camera, and
   the collision avoidance system further comprises a level component configured to:
      measure a direction of inclination and a degree of inclination of the mobile asset, and
      initiate an adjustment of the protective field based on the direction of inclination and the degree of inclination.

6. The collision avoidance system of claim 1, further comprising a diagnostic component configured to initiate a diagnostic sequence that verifies accuracies of the measured distance values $d_{so}$,
   wherein
   the light pulses are first light pulses,
   the subset of the light pulses are a first subset of the light pulses,
   the electrical energy is first electrical energy,
   the emitter component is configured to, during the diagnostic sequence, emit second light pulses into the space in front of the mobile asset while no obstacles are present in the space,
   the photo-sensor component is configured to, during the diagnostic sequence, convert a second subset of the light pulses reflected from the ground or floor and received at a subset of the pixels corresponding to the ground or floor to second electrical energy proportional to the second subset of the light pulses,
   the distance determination component is configured to, during the diagnostic sequence,
      determine measured distance values $d_{sg}$ associated with respective pixels of the subset of the pixels corresponding to the ground or floor based on analysis of the second electrical energy,
      compare the measured distance values $d_{sg}$ with expected values of $d_{sg}$ for the respective pixels of the subset of pixels, and
      in response to determining that a number of the measured distance values $d_{sg}$ greater than a defined threshold number deviate from their corresponding expected values of $d_{sg}$ in excess of a defined tolerance, instruct the control output component to initiate another control output that places the mobile asset in a safe state.

7. The collision avoidance system of claim 6, wherein the distance determination component is configured to determine the expected values of $d_{sg}$ corresponding to the respective pixels of the subset of the pixels based on a height $h_c$ of the three-dimensional camera from the ground or floor, the field of view angles β of the respective pixels of the subset of the pixels, and the inclination angle α of the three-dimensional camera.

8. The collision avoidance system of claim 1, wherein the safety action is at least one of a divergence of the mobile asset's path of travel, a slowing of the mobile asset, or a stoppage of the mobile asset.

9. The collision avoidance system of claim 1, wherein the three-dimensional camera is configured to mount to the mobile asset using a gimbal stabilizer that maintains a consistent average inclination angle α of the three-dimensional camera.

10. A method for automated collision avoidance, comprising:
    emitting, by a three-dimensional camera mounted on a front side of an automated moving machine at a downward tilt, light pulses into a monitored area in front of the automated moving machine, wherein the downward tilt is such that a portion of a ground or floor in front of the automated moving machine is within a field of view of the three-dimensional camera;
    for respective pixels of a pixel array of the three-dimensional camera, generating, by the three-dimensional camera, electrical energy proportional to a subset of the light pulses received at the respective pixels from surfaces within the monitored area;
    determining, by the three-dimensional camera based on analysis of the electrical energy, measured distance values $d_{so}$ representing first distances from the respective pixels to corresponding points within the monitored area in front of the automated moving machine along optical paths of the pixels;
    determining, by the three-dimensional camera, calculated distance values $d_{vo}$ representing second distances from the points within the monitored area to the automated moving machine along lines substantially parallel to a slope of the ground or floor based on the measured distance values $d_{so}$, field of view angles β of the respective pixels defining angles between optical axes of the respective pixels' and an upper boundary of the field of view of the three-dimensional camera, and an inclination angle α of the three-dimensional camera relative to horizontal; and
    in response to determining that at least a subset of the calculated distance values $d_{vo}$ satisfy a defined criterion indicative of a presence of an obstacle within a protective field of the three-dimensional camera, initiating, by a collision avoidance system comprising a processor, a safety action that alters operation of the automated moving machine to mitigate a collision with the obstacle.

11. The method of claim 10, wherein the determining that at least the subset of the calculated distance values $d_{vo}$ satisfy the defined criterion comprises:
    determining a number of pixels having associated calculated distance values $d_{vo}$ that are less than a minimum safe distance, and
    determining that the number of pixels is greater than a defined threshold number of pixels.

12. The method of claim 10, wherein the determining the calculated distance values $d_{vo}$ comprises determining the calculated distance value $d_{vo}$ for a pixel, of the respective pixels, based on a product of the measured distance value $d_{so}$ for the pixel and a cosine of a sum of the field of view angle β for the pixel and the inclination angle α.

13. The method of claim 10, wherein the initiating the safety action comprises initiating the safety action further in response to determining that at least the subset of the calculated distance values $d_{vo}$ that satisfy the defined criterion are associated with pixels that are within a portion of the array of pixels corresponding to the protective field of the three-dimensional camera.

14. The method of claim 13, further comprising:
    measuring, by the collision avoidance system, a direction of inclination and a degree of inclination of the automated moving machine relative to horizontal, and
    initiating, by the collision avoidance system, an adjustment of the protective field based on the direction of inclination and the degree of inclination.

15. The method of claim 10, wherein
    the light pulses are first light pulses,
    the subset of the light pulses are a first subset of the light pulses,
    the electrical energy is first electrical energy, and
    the method further comprises executing, by the collision avoidance system, a diagnostic sequence that verifies accuracies of the measured distance values $d_{so}$, wherein the diagnostic sequence comprises:
    emitting, by the three-dimensional camera, second light pulses into the monitored area in front of the automated moving machine while no obstacles are present in the monitored area;
    converting, by the three-dimensional camera, a second subset of the light pulses reflected from the ground or floor and received at a subset of the pixels corresponding to the ground or floor to second electrical energy proportional to the second subset of the light pulses;
    determining, by the three-dimensional camera, measured distance values $d_{sg}$ associated with respective pixels of the subset of the pixels corresponding to the ground or floor based on analysis of the second electrical energy;
    comparing, by the collision avoidance system, the measured distance values $d_{sg}$ with expected values of $d_{sg}$ for the respective pixels of the subset of pixels; and
    in response to determining that a number of the measured distance values $d_{sg}$ greater than a defined threshold number deviate from their corresponding expected values of $d_{sg}$ in excess of a defined tolerance, generating, by the collision avoidance system, a control output that places the automated moving machine in a safe state.

16. The method of claim 15, further comprising determining, by the collision avoidance system, the expected values of $d_{sg}$ corresponding to the respective pixels of the subset of the pixels based on a height $h_c$ of the three-dimensional camera from the ground or floor, the field of view angles β of the respective pixels, and the inclination angle α of the three-dimensional camera.

17. The method of claim 10, further comprising initiating, by the collision avoidance system as the safety action, at least one of a change of the automated moving machine's path of travel, a slowing of the automated moving machine, or a stoppage of the automated moving machine.

18. A non-transitory computer-readable medium having stored thereon instructions that, in response to execution, cause a collision avoidance system to perform operations, the operations comprising:

emitting light pulses from a three-dimensional camera into a monitored area in front of a mobile asset, wherein the three-dimensional camera is angled downward such that a portion of a ground or floor in front of the mobile asset is within a field of view of the three-dimensional camera;

for respective pixels of a pixel array of the three-dimensional camera, generating electrical energy proportional to a subset of the light pulses received at the respective pixels from surfaces within the monitored area;

determining, based on analysis of the electrical energy, measured distance values $d_{so}$ representing first distances from the respective pixels to corresponding points within the monitored area in front of the mobile asset along optical axes of the pixels;

determining calculated distance values $d_{vo}$ representing second distances from the points within the space to the mobile asset along lines substantially parallel to a slope of the ground or floor based on the measured distance values $d_{so}$, field of view angles $\beta$ between optical axes of the respective pixels and an upper boundary of the field of view of the three-dimensional camera, and an inclination angle $\alpha$ of the three-dimensional camera relative to horizontal; and in response to determining that at least a subset of the calculated distance values $d_{vo}$ satisfy a defined criterion indicative of a presence of an obstacle within a protective field of the three-dimensional camera, initiating a safety action that alters operation of the mobile asset to mitigate a collision with the obstacle.

19. The non-transitory computer-readable medium of claim 18, wherein the determining that at least the subset of the calculated distance values $d_{vo}$ satisfy the defined criterion comprises:

determining a number of pixels having associated calculated distance values $d_{vo}$ that are less than a minimum safe distance, and determining that the number of pixels is greater than a defined threshold number of pixels.

20. The non-transitory computer-readable medium of claim 18, wherein the determining the calculated distance values $d_{vo}$ comprises determining the calculated distance value $d_{vo}$ for a pixel, of the respective pixels, based on a product of the measured distance value $d_{so}$ for the pixel and a cosine of a sum of the field of view angle $\beta$ for the pixel and the inclination angle $\alpha$.

* * * * *